(12) United States Patent
Bleazard

(10) Patent No.: US 8,794,454 B2
(45) Date of Patent: Aug. 5, 2014

(54) BICYCLE STORAGE SYSTEM

(76) Inventor: Craig S. Bleazard, Grantsville, UT (US)

( * ) Notice: Subject to any disclaimer, the term of this patent is extended or adjusted under 35 U.S.C. 154(b) by 0 days.

(21) Appl. No.: 13/564,835

(22) Filed: Aug. 2, 2012

(65) Prior Publication Data

US 2013/0043198 A1 Feb. 21, 2013

Related U.S. Application Data

(60) Provisional application No. 61/515,215, filed on Aug. 4, 2011.

(51) Int. Cl.
*E05B 65/00* (2006.01)
*B62H 3/00* (2006.01)

(52) U.S. Cl.
USPC .................................... 211/19; 211/5; 70/234

(58) Field of Classification Search
USPC ............ 211/1.3, 5, 17, 18, 19, 20, 22, 23, 24, 211/89.01, 106.01, 196, 197, 205, 207; 248/121, 127; 70/233–236
See application file for complete search history.

(56) References Cited

U.S. PATENT DOCUMENTS

| | | | | |
|---|---|---|---|---|
| 607,024 | A | * | 7/1898 | Durfee et al. .................... 211/18 |
| 607,545 | A | * | 7/1898 | Martin ............................ 70/234 |
| 611,401 | A | * | 9/1898 | White ............................. 70/234 |
| 618,507 | A | * | 1/1899 | Henderson et al. ............... 211/5 |
| 621,072 | A | * | 3/1899 | Gregory ........................... 211/5 |
| 631,665 | A | * | 8/1899 | Potter .............................. 211/5 |
| 4,352,432 | A | | 10/1982 | Smith |
| 4,392,572 | A | * | 7/1983 | Bernard .......................... 211/19 |
| 4,416,379 | A | * | 11/1983 | Graber ........................... 211/19 |
| 5,183,162 | A | * | 2/1993 | Ritzenthaler ................. 211/1.57 |
| 5,294,006 | A | * | 3/1994 | Deschino ........................ 211/18 |
| 5,492,228 | A | * | 2/1996 | Botkin ......................... 211/85.7 |
| 5,772,048 | A | * | 6/1998 | Sopcisak ........................ 211/20 |
| 5,941,397 | A | | 8/1999 | Buchanan et al. |
| 6,164,459 | A | * | 12/2000 | Liem ................................ 211/5 |
| 6,494,327 | B2 | * | 12/2002 | Huang ............................ 211/17 |
| 6,820,842 | B1 | * | 11/2004 | Chuang ...................... 248/125.8 |
| 6,843,380 | B1 | * | 1/2005 | Fickett ............................ 211/22 |
| 6,877,613 | B2 | | 4/2005 | Bleazard |
| 6,978,570 | B1 | | 12/2005 | Clark et al. |
| 6,983,853 | B1 | * | 1/2006 | Fickett ............................ 211/18 |
| 7,150,359 | B1 | | 12/2006 | Lyons et al. |
| 7,883,068 | B2 | * | 2/2011 | Forest et al. ................... 248/324 |
| 8,047,492 | B2 | * | 11/2011 | Wang ............................ 248/307 |
| 8,528,748 | B2 | * | 9/2013 | Shaha et al. ..................... 211/22 |
| 8,528,749 | B2 | * | 9/2013 | Kerman .......................... 211/22 |
| 2004/0222172 | A1 | | 11/2004 | Bleazard |
| 2005/0034566 | A1 | | 2/2005 | Bangert |
| 2011/0240572 | A1 | * | 10/2011 | Kerman .......................... 211/20 |
| 2012/0027560 | A1 | * | 2/2012 | Olsen ............................ 414/800 |

* cited by examiner

*Primary Examiner* — Joshua Rodden
(74) *Attorney, Agent, or Firm* — Madson IP, P.C.

(57) ABSTRACT

A bicycle storage system has an apparatus with a collar within which a core member is rotatably engaged and a height adjustment rail system. A pair of locking arms is pivotally attached to the core member such that each of the locking arms has an open position designed to permit insertion or withdrawal of a bicycle wheel and a closed position designed to block withdrawal of the wheel. Rotation of the core member locks the locking arms in the closed position. Bicycles of various sizes can be stored in the apparatus mounted on the height adjustment rail system by inserting the front wheel into engagement with the locking arms, rotating the front wheel from a substantially vertical plane to lock the locking arms in the closed position, and elevating the front wheel above the rear wheel by moving the apparatus along the rails of the height adjustment rail system.

14 Claims, 17 Drawing Sheets

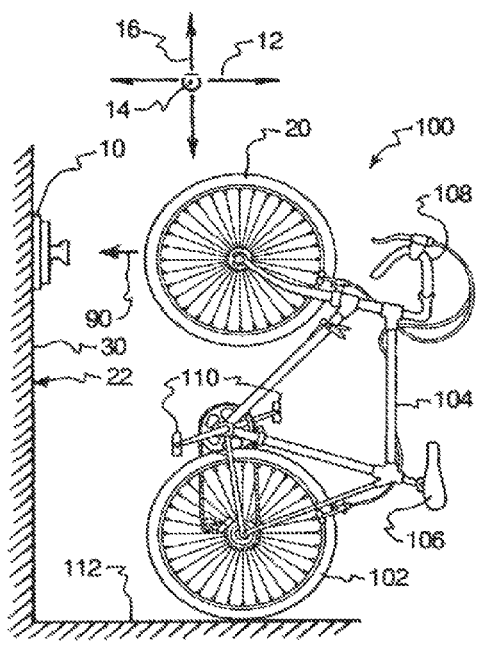
PRIOR ART Fig.4
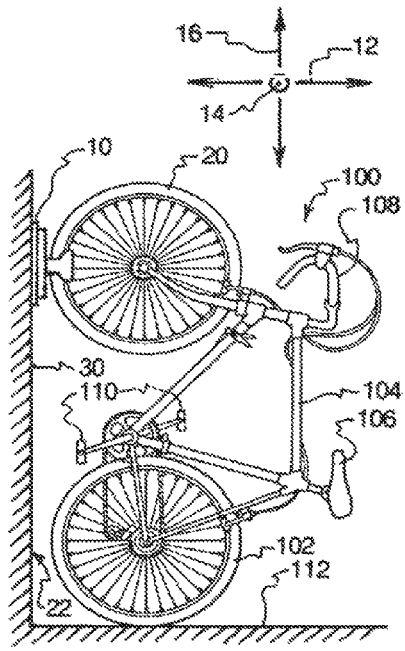
PRIOR ART Fig.5
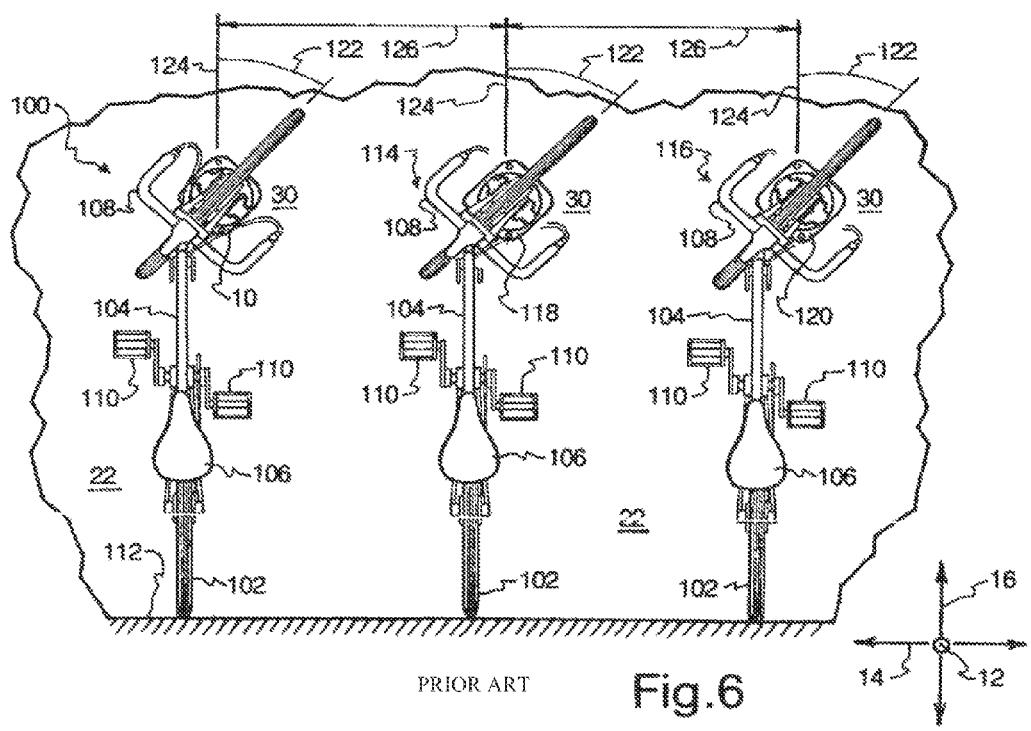
PRIOR ART Fig.6

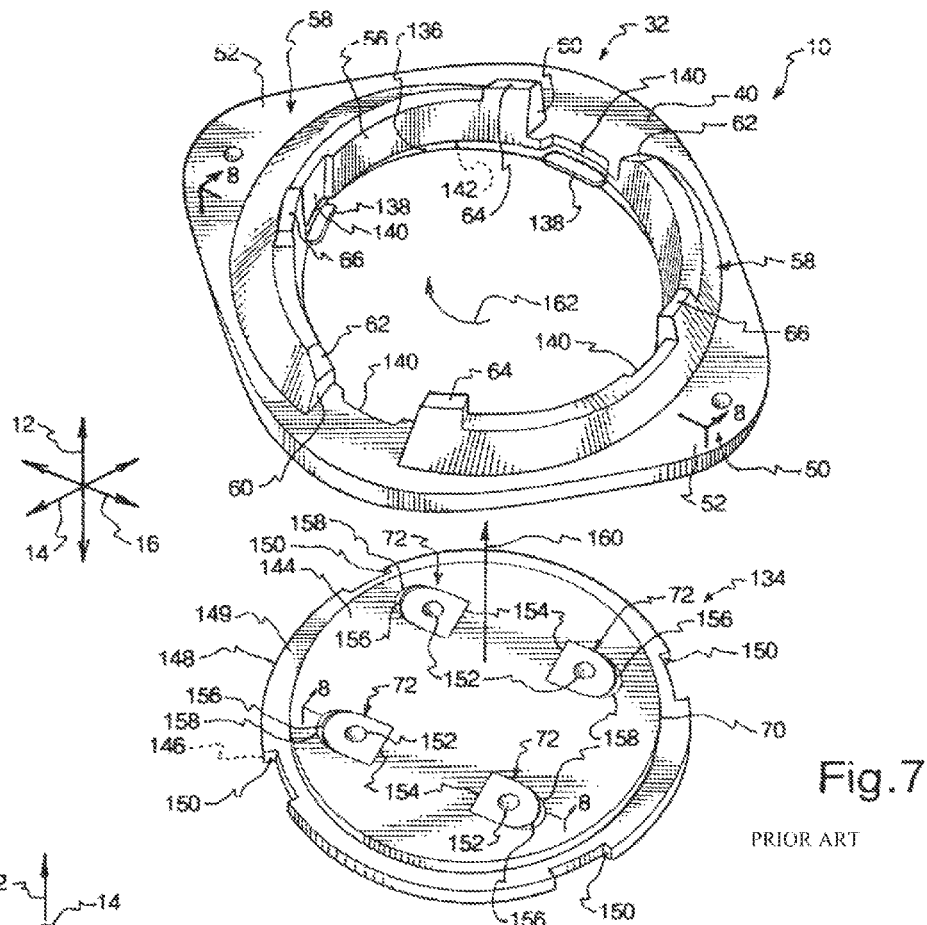
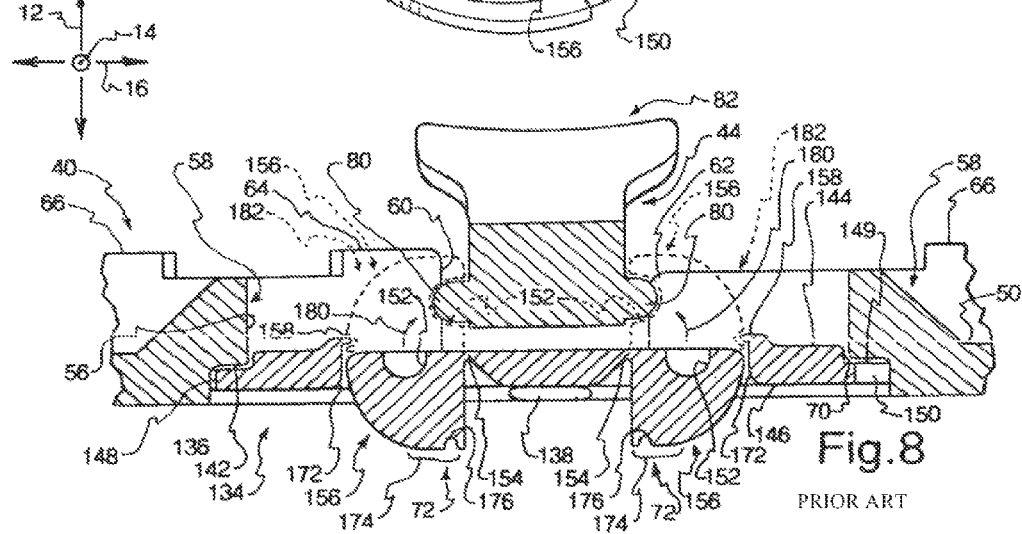
Fig. 7
PRIOR ART
Fig. 8
PRIOR ART

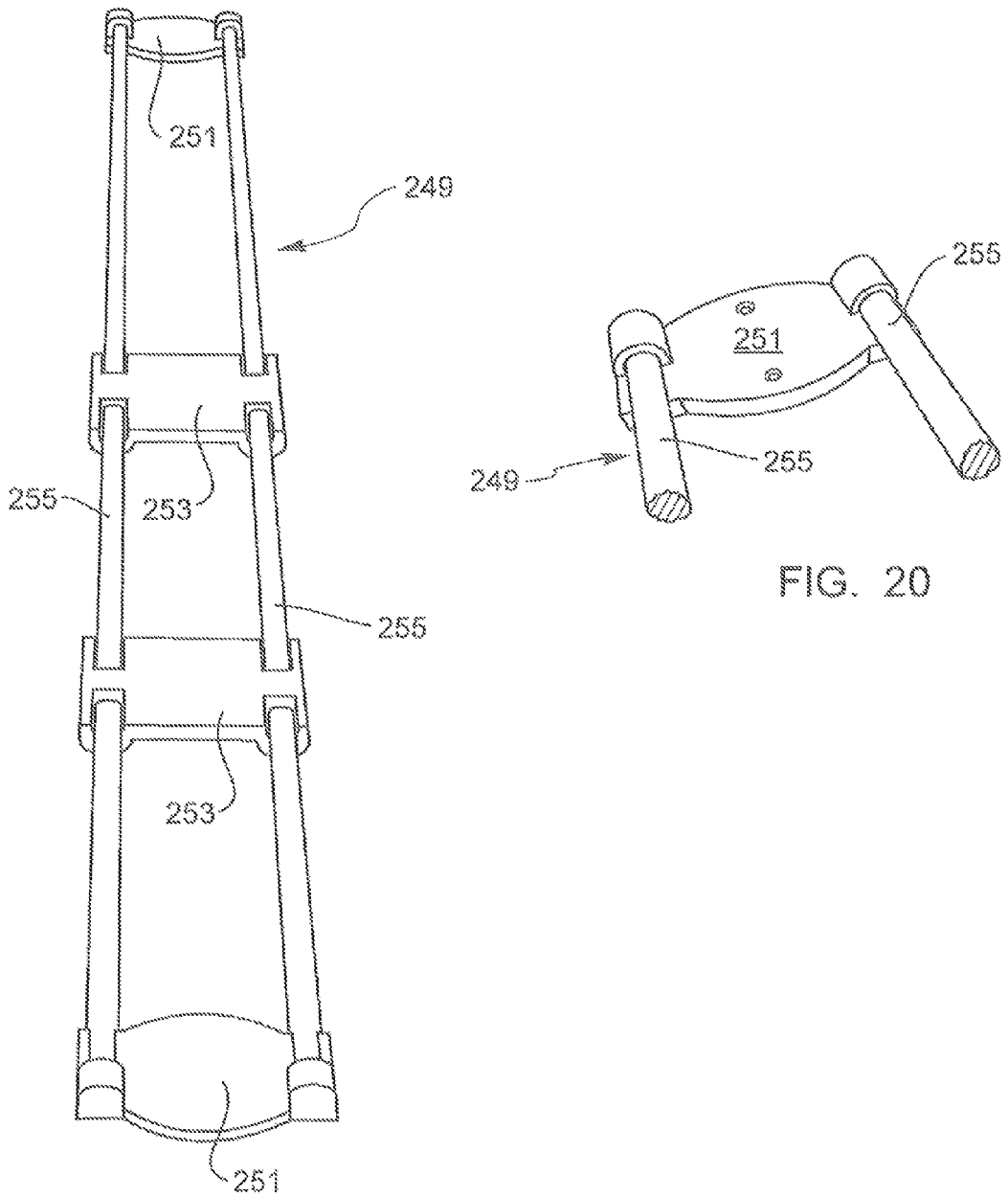

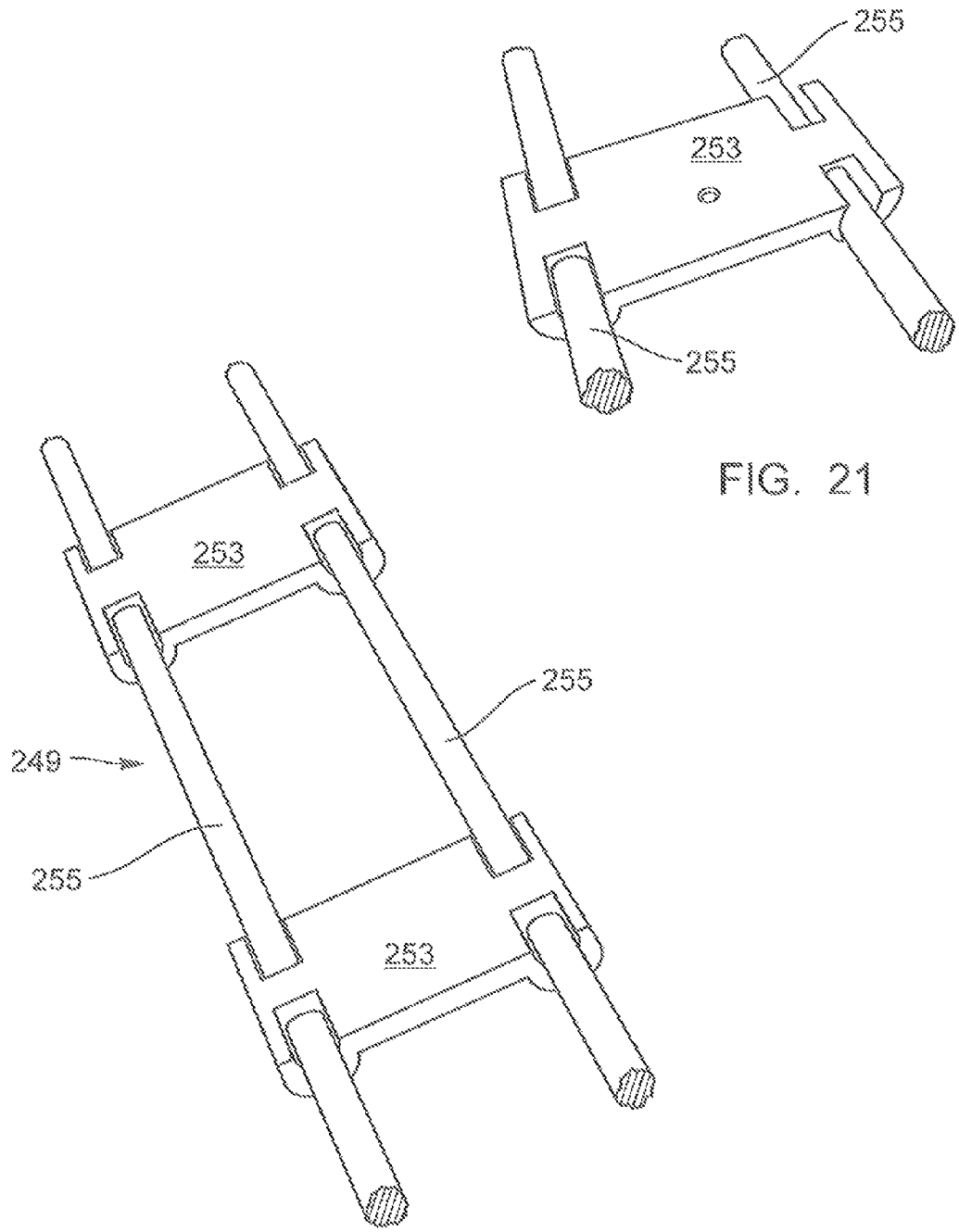

BICYCLE STORAGE SYSTEM

RELATED APPLICATION

This patent application claims the benefit of U.S. Provisional Patent Application Ser. No. 61/515,215, that was filed on Aug. 4, 2011, for an invention titled BICYCLE STORAGE SYSTEM, which is hereby incorporated herein by this reference.

BACKGROUND OF THE INVENTION

1. Field of the Invention

The present invention relates to vehicle storage. More specifically, the present invention relates to an apparatus and system that enables bicycles to be compactly and easily stored and retrieved from storage for use.

2. The Relevant Technology

Bicycles represent one of the most common forms of transportation and recreation. Many households own multiple bicycles. However, due to their length, bicycles require a considerable amount of storage space and a large footprint. Furthermore, bicycles are often leaned against a kickstand or some other object. Thus, they are stored in an unstable manner and may easily be knocked over or otherwise damaged.

Due to these problems, racks, hooks, and other storage devices have been developed. However, such devices also have a number of deficiencies. Storage racks may provide some stability, but often require as much space, or possibly even more space than the bicycle, alone, would require. Other devices such as storage hooks and clamps require the bicycle to be lifted and placed on the device. Bicycles are awkward to lift, and many people, especially children, simply lack the strength to lift the bicycle onto or off of the device. Also, if the hooks are overhead, frequently the person placing the bicycle on the hooks or removing the bicycle from the hooks must climb a ladder and lift the bicycle at the same time. This can be quite dangerous and has resulted in serious injury to the person and damage to the bicycle when the person becomes unbalanced and falls from the ladder, either with or without the bicycle in hand.

Furthermore, some known devices require that the user perform a number of additional steps to latch or unlatch the bicycle, or to move it between a stowed position and an accessible position. This makes bicycle storage somewhat inconvenient and, in some cases, provides only a minimal benefit over storage of the bicycle without any storage device. Some known storage devices are, themselves, quite heavy, bulky, and/or expensive.

U.S. Pat. No. 6,877,613 entitled "Bicycle storage apparatus and method" describes a storage apparatus designed to be attached to a wall so that a front wheel of the bicycle can be retained against the wall. The general description and subject matter of U.S. Pat. No. 6,877,613 is incorporated into this provisional application by this reference. The apparatus is disposed at an attachment portion of the wall with a height selected such that the bicycle is disposed with the front wheel generally over the rear wheel, so that the bicycle takes up a comparatively narrow footprint. However, improvements have been made to this general design to increase safe use of the general design and to afford significantly more versatility to the storage apparatus. It is these improvements that are the subject matter of this application.

Hence, it would advance the art to provide a bicycle storage system capable of compactly storing bicycles in a manner that does not require the entire weight of the bicycle to be lifted by the user. Furthermore, it would advance the art to provide a bicycle storage device that would enable a bicycle to be quickly and easily retained for storage or removed for use. Yet further, it would further advance the art to provide such a bicycle storage system that is compact, lightweight, versatile, and inexpensive.

BRIEF SUMMARY OF THE INVENTION

The apparatus of the present disclosure has been developed in response to the present state of the art, and in particular, in response to the problems and needs in the art that have not yet been fully solved by currently available bicycle storage devices. Thus, it is an overall objective to provide a bicycle storage system capable of remedying many of the shortcomings of the prior art.

To achieve the foregoing objective, and in accordance with the embodiments broadly described herein, an apparatus for storing bicycles is provided. The apparatus is designed to be attached to a wall or to a mechanism attached to a wall so that a front wheel of the bicycle can be retained against the wall or very near to it. In one embodiment, the apparatus is disposed at an attachment portion of the wall with a height selected such that the bicycle is disposed with the front wheel generally over the rear wheel, so that the bicycle takes up a comparatively narrow footprint. In another embodiment, the apparatus is secured to a mechanism that is attached to a portion of the wall and has a range of height selections available for slidably disposing the bicycle with the front wheel generally over the rear wheel, so that the bicycle can be elevated above the floor to take up a comparatively narrow footprint and occupy otherwise wasted space above the floor level.

In one embodiment, the apparatus includes a base member in the form of a collar. The collar rotatably retains a shuttle, which takes the form of a core member with a generally disk-like shape. A first locking arm and a second locking arm are pivotally attached to the shuttle. The collar has a plate with an interior surface that generally encircles the core member. Retention features, in the form of arcuate lips, extend from the plate along the interior surface. Each of the arcuate lips has a clockwise limiting feature and a counterclockwise limiting feature.

The core member has a peripheral edge that abuts the peripheral edge of the collar so that the core member is rotatably captured by the collar. The core member has two anchors for each of the locking arms; each locking arm is pivotally attached to a pair of anchors. Each locking arm then pivots between an open position that permits withdrawal of the front wheel and a closed position that blocks withdrawal of the front wheel. While in the closed position, a locking mechanism may be provided to prevent the rotation of the core member when engaged. When disengaged, the locking mechanism permits the rotation of the core member from the closed position back to the open position so that the bicycle can be retrieved from the apparatus for use. A preferred locking mechanism has a locking pin, a pin channel in the base member, and a pin-receiving cavity in the core member. Of course, there are numerous ways to lock the shuttle from rotating and are contemplated herein.

Each locking arm has a gripping end, a receiving end, and a locking feature. The gripping end is designed to capture the front wheel. The receiving end induces the locking arms to close in response to pressure from the front wheel when the front wheel is inserted into the apparatus. The locking feature enables the locking arms to be locked in the closed position by rotating the shuttle. In an alternative embodiment, the gripping end is removable from the locking arm and can be positioned to accommodate either skinny tires or fat tires, and thereby any of the tire sizes in between. The locking arm has a receiving groove and the gripping end has two protrusions, each of which can slide into the receiving groove to securely position the gripping end in either the skinny tire configuration or the fat tire configuration. As additional support for the bicycle tire while nested in the apparatus, side support blocks are provided. The side support blocks also provide torque points to facilitate the rotation of the shuttle without applying undue pressure to the locking arms. The side support blocks are removable from the core member and can be secured into positions to accommodate either a skinny tire or a fat tire.

Thus, a bicycle may easily be engaged by the apparatus. According to one storage method, the bicycle is first drawn into a substantially vertical orientation, so that the front wheel is positioned generally above the rear wheel. The locking arms are moved into the open position if they are not already open. The front wheel is oriented within a substantially vertical plane and moved toward the locking arms. When the tire of the front wheel contacts the receiving ends, the locking arms are pivoted to the closed position so that the griping ends block removal of the wheel from the locking arms.

The front wheel is then rotated to some angle with respect to the substantially vertical plane to rotate the core member within the collar. The locking arms rotate with the core member so that the locking features of the locking arms are restrained by the arcuate lips of the collar. Thus, the locking arms are moved to the closed position by rotation of the core member to retain the bicycle. For additional safety, the locking mechanism can be activated to prevent the rotation of the shuttle until it is disengaged.

The bicycle may be withdrawn from the apparatus by generally reversing the above steps. More precisely, if the locking mechanism is engaged, it is disengaged and the front wheel is rotated back into the substantially vertical plane to rotate the core member back to its original position, thereby unlocking the locking arms. The front wheel is then withdrawn from the apparatus so that a rim of the front wheel presses against the gripping ends to move the locking arms to the open position. The front wheel can then be fully withdrawn, and the bicycle can be returned to its normal horizontal orientation for riding.

According to one method of manufacturing the apparatus, the collar, the core member, and the locking arms are manufactured from a plastic by a method such as blow molding. The collar has a number of tabs that extend inward, parallel to an annular retention surface. The tabs are aligned with notches in the arcuate lips and the plate of the collar so that the tabs collar can be formed with an injection molding process or a simple blow-molding process, in which only two molds or "plates" converge to define the shape of the collar.

Through the use of the bicycle storage apparatus and method of the present disclosure, one or more bicycles may be stored in a relatively compact and stable manner. Furthermore, the bicycles may be easily stored or removed from storage for use without requiring the application of a considerable amount of strength. The apparatus may be easily and inexpensively manufactured.

If the apparatus is attached directly to the wall, it is secured at a height determined by the height of the bicycle when vertically disposed. Hence once the apparatus is secured to the wall, it will receive for proper storage only bicycles of a certain height. To make the apparatus more versatile by receiving bicycles of various lengths, the apparatus may be secured to a height adjustment rail system that is secured to the wall. If it is desired to secure and store bicycles with the rear wheel resting on the floor, the lowermost end bracket of the height adjustment rails system can be secured to the wall near the floor. If it is desired to secure and store the bicycle elevated above the floor, to capture otherwise unused storage space above the floor, the height adjustment rail system can be secured to the wall such that the lowermost end bracket is above the floor.

These and other features of the present disclosure will become more fully apparent from the following description, or may be learned by the practice of the embodiments as set forth hereinafter.

BRIEF DESCRIPTION OF THE DRAWINGS AND PHOTOGRAPHS

In order that the manner in which the above-recited and other features and advantages of this disclosure are readily understood, a more particular description will be rendered by reference to specific embodiments thereof which are illustrated in the appended drawings. Understanding that these drawings depict only typical embodiments and are not therefore to be considered to be limiting in scope, the embodiments will be described and explained with additional specificity and detail through the use of the accompanying drawings in which:

FIG. 1 is a perspective view of a prior art apparatus for storing bicycles according to U.S. Pat. No. 6,877,613, showing the apparatus in the open and unlocked position ready to receive a front wheel of a bicycle;

FIG. 2 is a perspective view of the prior art apparatus for storing bicycles of FIG. 1 showing the apparatus in the closed but unlocked position after insertion of the wheel into engagement with the apparatus;

FIG. 3 a perspective view of the prior art apparatus for storing bicycles of FIG. 1, in the closed and locked position to retain the front wheel until the apparatus is returned to the unlocked position;

FIG. 4 is a side elevation view of a bicycle aligned for storage using the prior art apparatus of FIG. 1, with the apparatus in the open and unlocked position illustrated in FIG. 1;

FIG. 5 is a side elevation view of the bicycle, with the prior art apparatus in the closed but unlocked position illustrated in FIG. 2;

FIG. 6 is a rear elevation view of the bicycle together with a second bicycle stored with a second prior art apparatus and a third bicycle stored with a third prior art apparatus, with each prior art apparatus in the closed and locked position illustrated in FIG. 3;

FIG. 7 is a perspective view illustrating assembly of the collar and a workpiece according to one method of manufacturing the prior art apparatus of FIG. 1;

FIG. 8 is a side elevation, cutaway section view of the collar and workpiece illustrating motion of the anchors into place to form the core member and retain the locking arms according to the prior art manufacturing method;

FIG. 19 is a perspective view of a height adjustment rail system without the apparatus attached;

FIG. 20 is a perspective view of an end bracket for the height adjustment rail system;

FIG. 21 is a perspective view of a sliding bracket for the height adjustment rail system;

FIG. 22 is a perspective view of sliding brackets spaced to receive the attachment of an apparatus;

Figure 25:
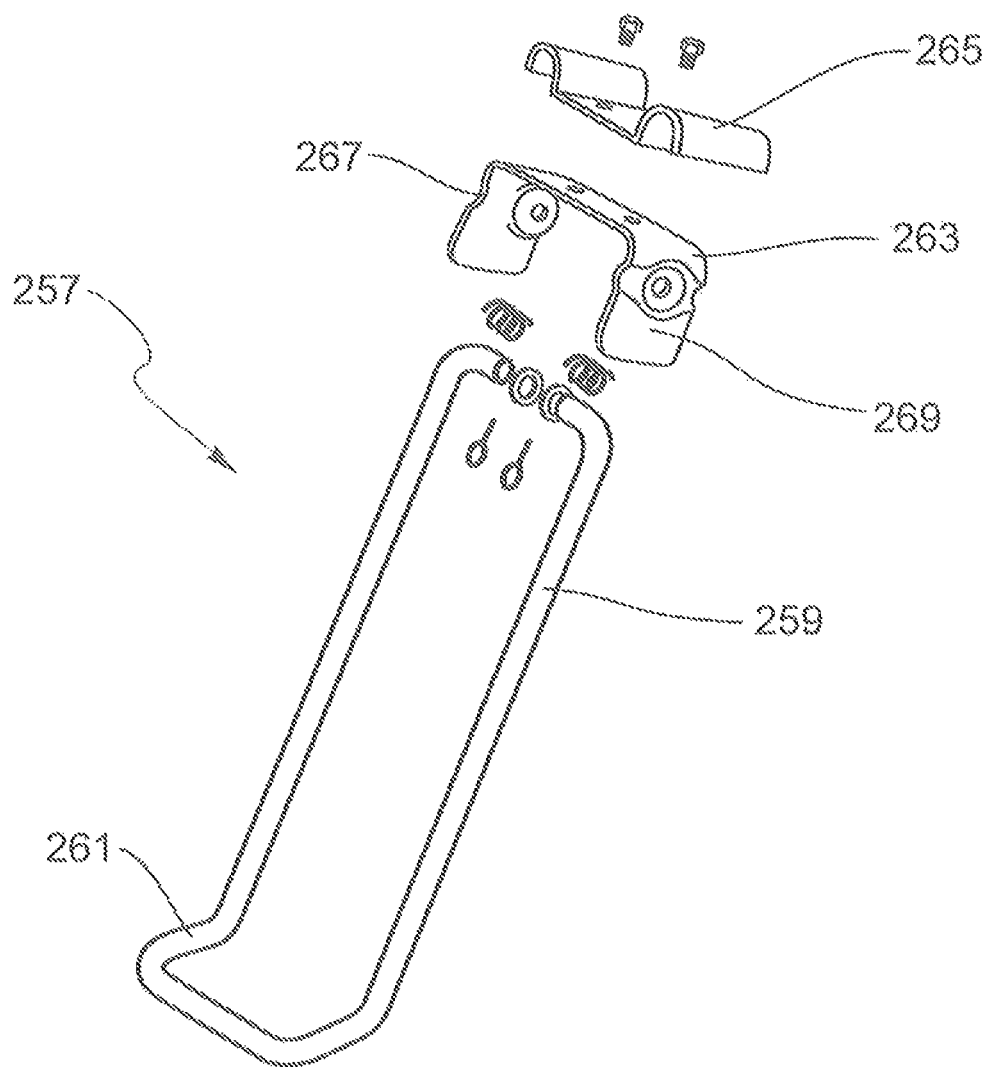
Figure 26:
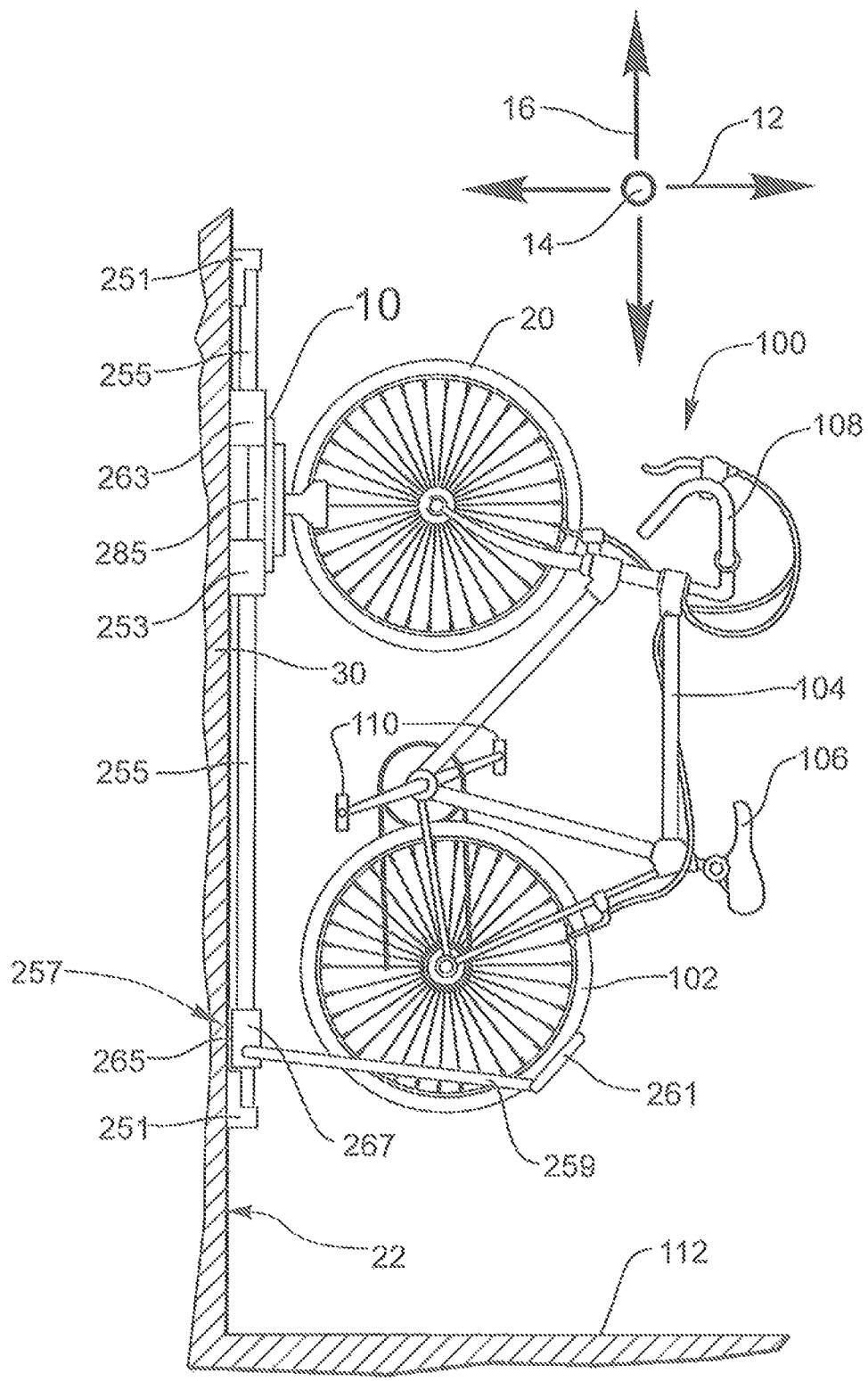

FIG. 25 is an exploded view of an exemplary two-position rear tire rest that can be attached to the lowermost end bracket or the rails of the height adjustment rail system to enable the height adjustment rail system to elevate stored bicycles above the ground level; and FIG. 26 is a side elevation view of the bicycle secured to an improved apparatus and elevated above the floor by the height adjustment rail system and held there by the rear tire rest.

DETAILED DESCRIPTION OF THE INVENTION

The presently preferred embodiments of the present disclosure will be best understood by reference to the drawings, wherein like parts are designated by like numerals throughout. It will be readily understood that the components of the present disclosure, as generally described and illustrated in the figures herein, could be arranged and designed in a wide variety of different configurations. Thus, the following more detailed description of the embodiments, as represented in the figures, is not intended to limit the scope of the invention, as claimed, but is merely representative of exemplary embodiments.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale nor made of a particular material unless specifically indicated.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Figure 1:
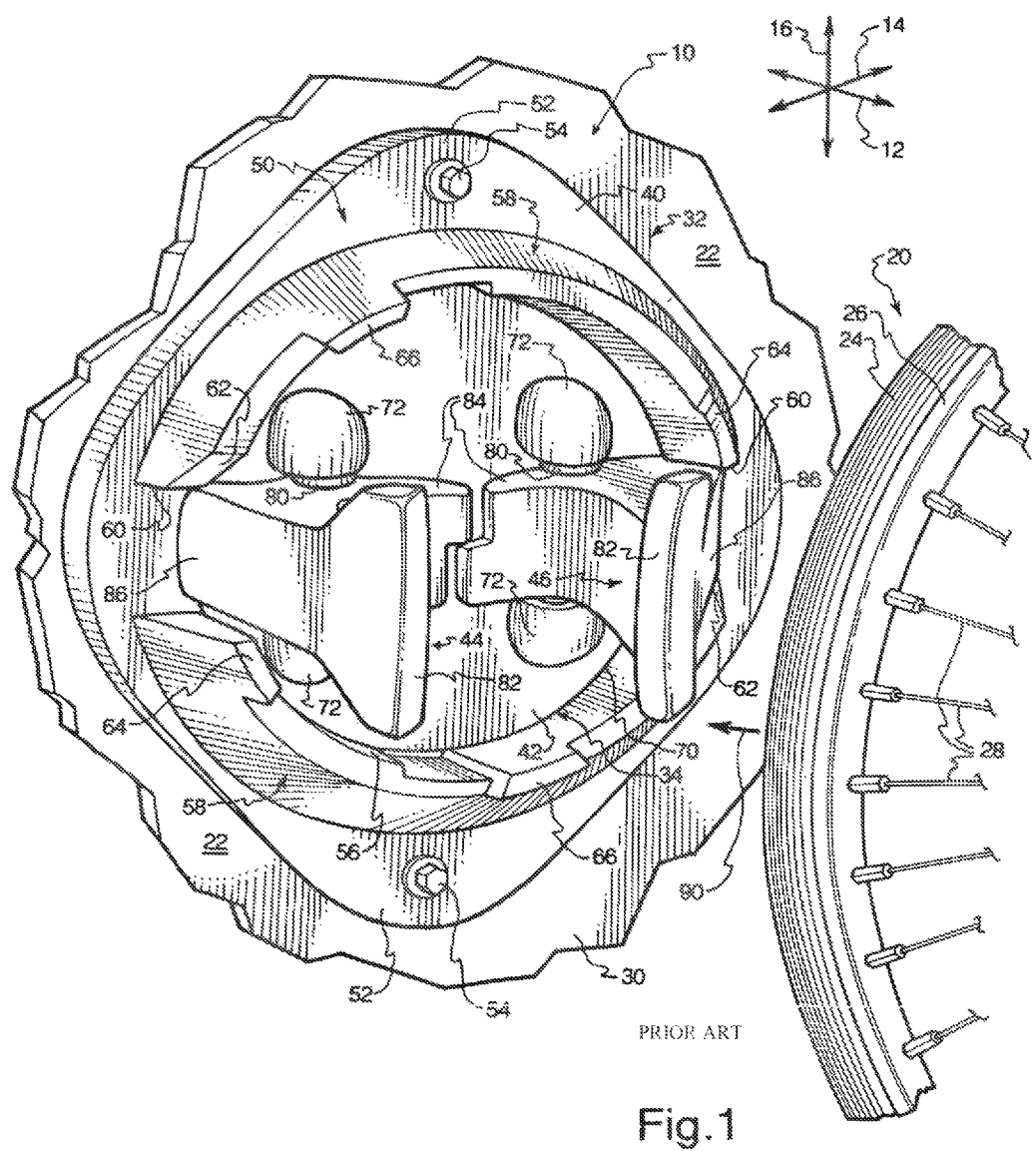

Referring to FIG. 1, a perspective view illustrates a prior art bicycle storage apparatus of U.S. Pat. No. 6,877,613. The description of the prior art device is provided to establish terminology and to give context to the improvements described herein. Where the prior art apparatus and the improved apparatus have like parts, like reference numbers will be used.

The prior art apparatus 10 has a longitudinal direction 12, a lateral direction 14, and a transverse direction 16. The prior art apparatus 10 is used to secure a wheel 20, such as a front wheel 20 of a bicycle, to a wall 22. The wheel 20 may be any of a variety of known bicycle wheel types, e.g., skinny road bike racing tires, fat mountain bike tires, and other known bicycle tires. As shown in FIG. 1, the wheel 20 may have a tire 24, a rim 26, and a plurality of spokes 28 that support the rim 26 with respect to a hub (not shown).

The wall 22 has an attachment portion 30 to which the prior art apparatus 10 is attached to receive the wheel 20. The prior art apparatus 10 of FIG. 1 is designed to retain a bicycle in a substantially vertical orientation. Hence, the attachment portion 30 is disposed at a height (i.e., position in the transverse direction 16) such that when the wheel 20 is elevated generally above the rear wheel (not shown) of the bicycle and the rear wheel rests on the ground, the prior art apparatus 10 is disposed generally at the same height as the wheel 20.

As illustrated, the prior art apparatus 10 has a base member 32 fixedly attached to the attachment portion 30 to movably retain a shuttle 34. The base member 32 and shuttle 34 may take a variety of configurations in which the shuttle 34 rotates, translates, or otherwise moves with respect to the base member 32. In the embodiment of FIG. 1, the base member 32 takes the form of a collar 40 with a generally annular configuration. The shuttle 34 is a core member 42 that is disposed generally within the collar 40 such that the core member 42 is rotatable within the collar 40.

In this application, "base member" refers to any object that can be affixed to a wall or other stationary structure. "Shuttle" refers to any device that is rotationally, translationally, or otherwise movably attachable to a base member. "Collar" refers to a structure with an opening capable of rotatably receiving a member. "Core member" refers to a member designed to rotate within an opening.

A first locking arm 44 is attached to the core member 42 in such a manner that the first locking arm 44 is movable with respect to the core member 42 between open and closed positions. In the prior art embodiment of FIG. 1, the first locking arm 44 is pivotally attached to the core member 42. The prior art apparatus 10 of FIG. 1 also includes a second locking arm 46 disposed generally opposite to the first locking arm 44. The second locking arm 46 also pivots with respect to the core member 42 between open and closed positions. As illustrated in FIG. 1, the locking arms 44, 46 are both in the open position to receive the wheel 20. "Locking arm" refers to a structure that is rotatable, translatable, or otherwise movable to retain or release a bicycle component such as the wheel 20.

The collar 40 includes a plate 50 oriented generally parallel to the attachment portion 30 of the wall 22. The plate 50 has a pair of attachment flanges 52 that extend generally in the transverse direction 16. The attachment flanges 52 are attached to the attachment portion 30 via fasteners 54, which may be bolts, as illustrated, or any other suitable attachment device. The collar 40 also has an interior surface 56 with a generally cylindrical profile designed to rotatably retain the core member 42.

Retention features protrude from the vicinity of the interior surface 56 along the longitudinal direction 12. In the prior art apparatus 10 of FIG. 1, the retention features take the form of a pair of arcuate lips 58 that provide a longitudinal continuation of the interior surface 56. The arcuate lips 58 are separated from each other by a pair of breaks 60 disposed at the lateral extents of the collar 40.

Each of the arcuate lips 58 has a beveled portion 62 designed to facilitate motion of the locking arms 44, 46 against the arcuate lips 58. Each of the arcuate lips 58 also has a counterclockwise limiting feature designed to limit counterclockwise rotation of the core member 42 and a clockwise limiting feature designed to limit clockwise rotation of the core member 42. In the prior art apparatus 10, the counterclockwise limiting features take the form of tabs 64 and the clockwise limiting features take the form of tabs 66, all of which extend from the arcuate lips 58 in the longitudinal direction 12. The operation of the beveled portion 62 and the tabs 64, 66 will be described in greater detail subsequently.

With the improved apparatus 210 of the present disclosure (shown in FIGS. 9-12, 14, 23 and 24), a shuttle locking mechanism is provided and generally designated by reference number 211. In a preferred embodiment, the shuttle locking mechanism 211 is located proximate tab 66 on the arcuate lip 58 and comprises a push/pull locking pin 213 disposed within a pin channel 215 in the arcuate lip 58 of base member 32, and a pin-receiving cavity 217 (FIG. 11) in the core member 42. The shuttle locking mechanism 211, when engaged, prevents the rotation of the core member 42, thereby providing additional safety from the unintended release of the bicycle from the improved apparatus 210 by merely rotating the front wheel of the bicycle. With the prior art apparatus 10, the wheel of the bicycle would release by merely rotating the wheel. Accordingly, someone not familiar with how the prior art apparatus worked, might unexpectedly release the wheel by grasping the bicycles handlebars and rotating the wheel.

Figure 10:
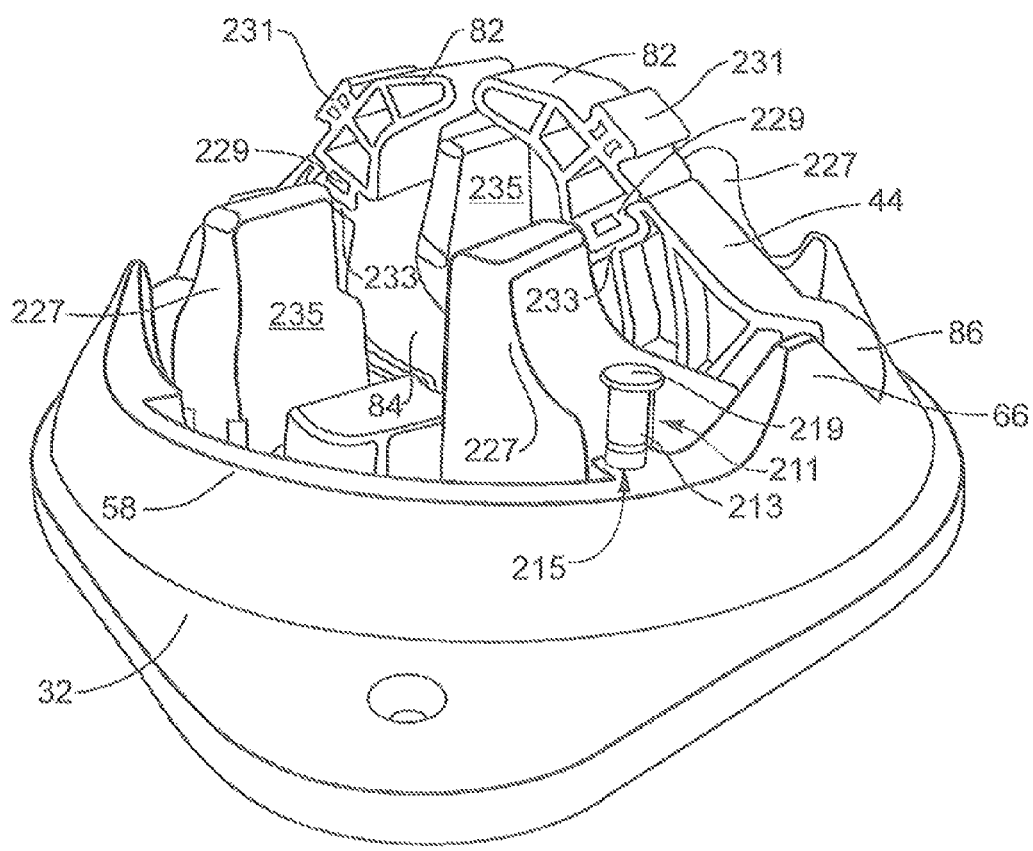
FIG. 10 is another perspective view of the improved apparatus of FIG. 9 showing the shuttle rotated and the locking arms in the closed configuration.
Figure 11:
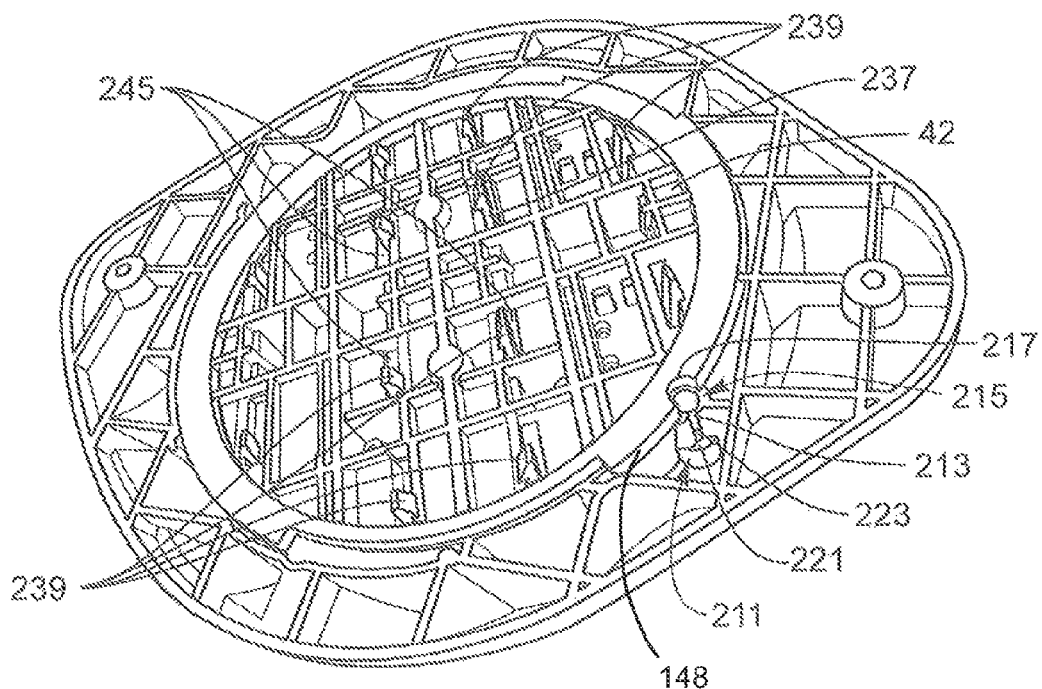
FIG. 11 is a perspective view of the underside of the improved apparatus showing the shuttle rotated to the position where a locking pin can be engaged.
Figure 12:
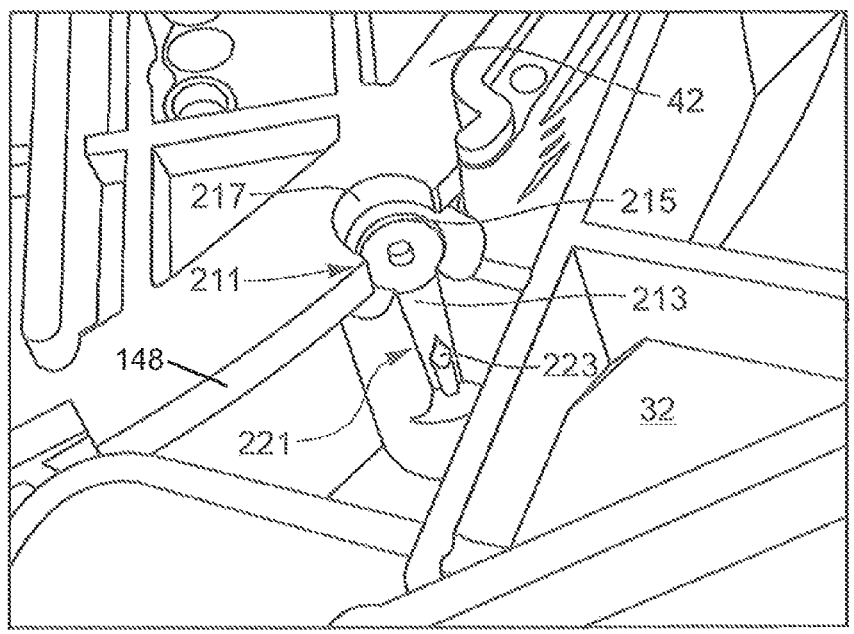
FIG. 12 is an enlarged perspective view of the underside of the improved apparatus rotated to the position where the locking pin can be engaged and showing the retention key for the locking pin.

Although other locking mechanisms 211 can be used to prevent the core member 42 from rotating and thereby releasing the front wheel of the bicycle unexpectedly, the embodiment described herein is preferred. The push/pull locking pin 213 has a head 219 to provide easy pushing and pulling of the push/pull locking pin 213 within the pin channel 215. As best seen in FIGS. 11 and 12, the base member 32 has a keyway 221 and the push/pull locking pin 213 has a protruding key 223 that limits the movement of the push/pull locking pin 213 within the pin channel 215. As shown in FIGS. 10-12, the push/pull locking pin 213 has been pulled to disengage from the pin-receiving cavity 217 and the key 223 abuts the keyway 221 (see FIG. 12) to prevent the push/pull locking pin 213 from removal from the pin channel 215. To engage the push/pull locking pin 213, the push/pull locking pin 213 is pushed so that its distal end enters the pin-receiving cavity 217, thereby preventing the core member 42 from rotating.

The core member 42 has a peripheral edge 70 with a generally cylindrical profile disposed directly inward of the interior surface 56 of the collar 40 such that the core member 42 is rotatably retained by the interior surface 56. With the improved apparatus 210, the outer edge 148 (FIGS. 7, 11 and 12) of the core member 42 has a pin-receiving cavity 217, as best shown in FIGS. 11 and 12. The core member 42 also has a plurality of anchors 72 protruding generally in the longitudinal direction 12 to pivotally retain the locking arms 44, 46. In the prior art apparatus 10 of FIG. 1, two anchors 72 are provided for each of the locking arms 44, 46.

Figure 17:
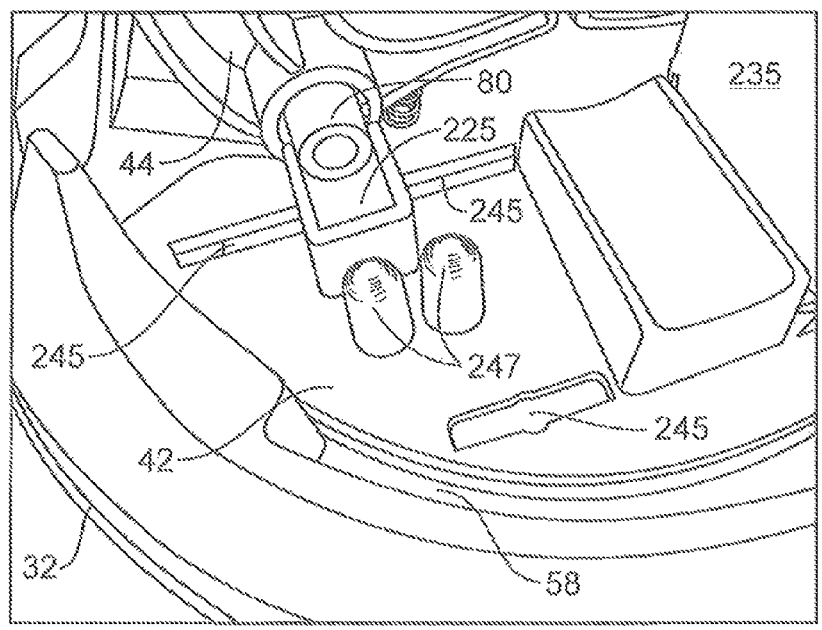
FIG. 17 is an enlarged perspective view of the shuttle of the improved apparatus with one of the side support blocks removed to reveal adjustment posts.
Figure 18:
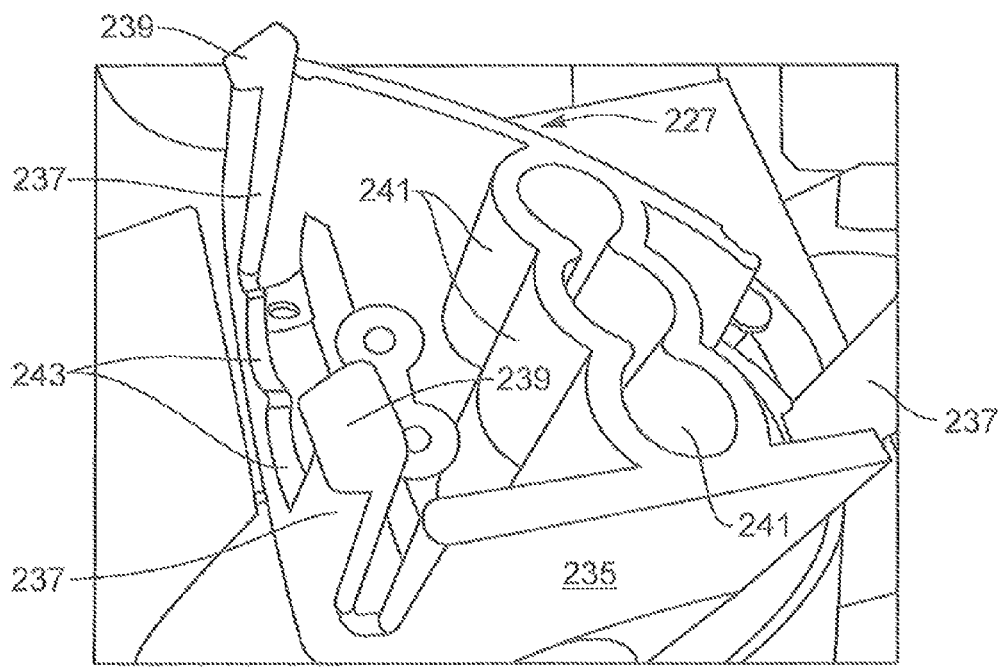
FIG. 18 is a close up perspective view of the underside of the removed side support block showing receiving wells for receiving the adjustment posts to adjust the position of the side support block on the shuttle.
Figure 23:
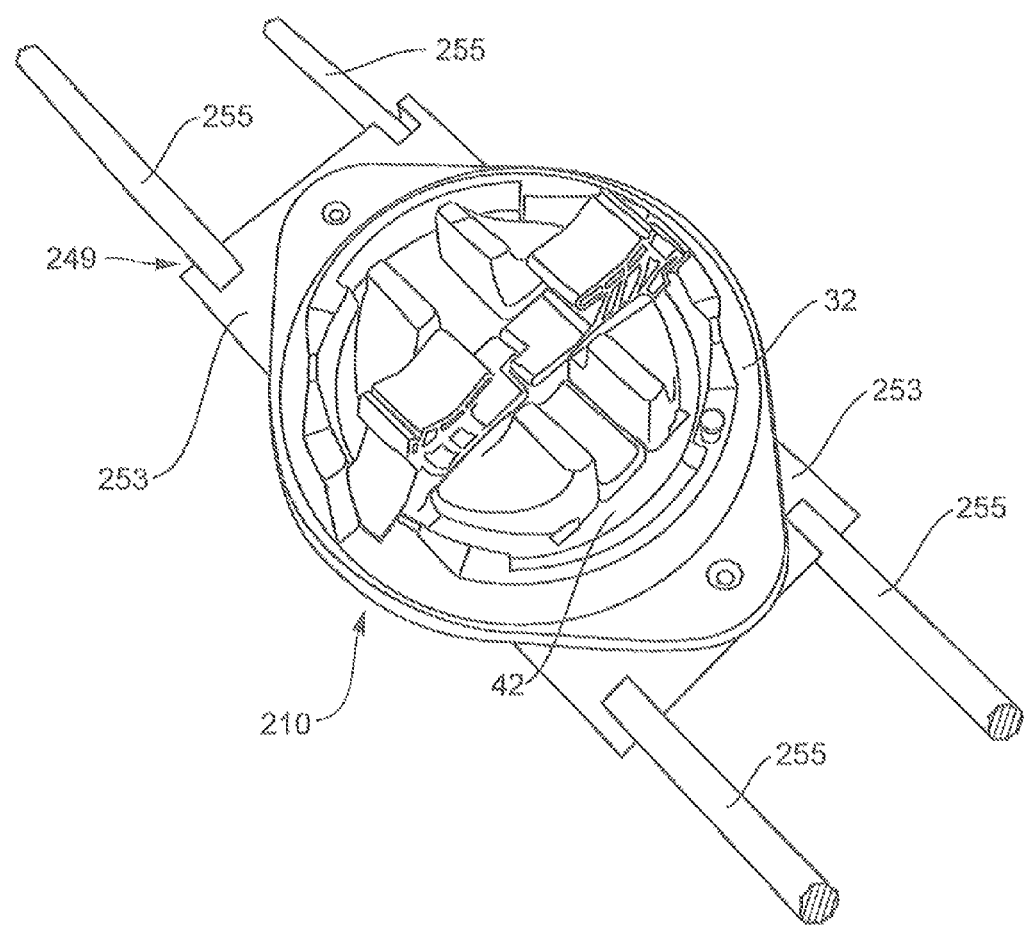
FIG. 23 is a perspective view of the improved apparatus positioned for attachment to the space sliding brackets of the height adjustment rail system.
Figure 24:
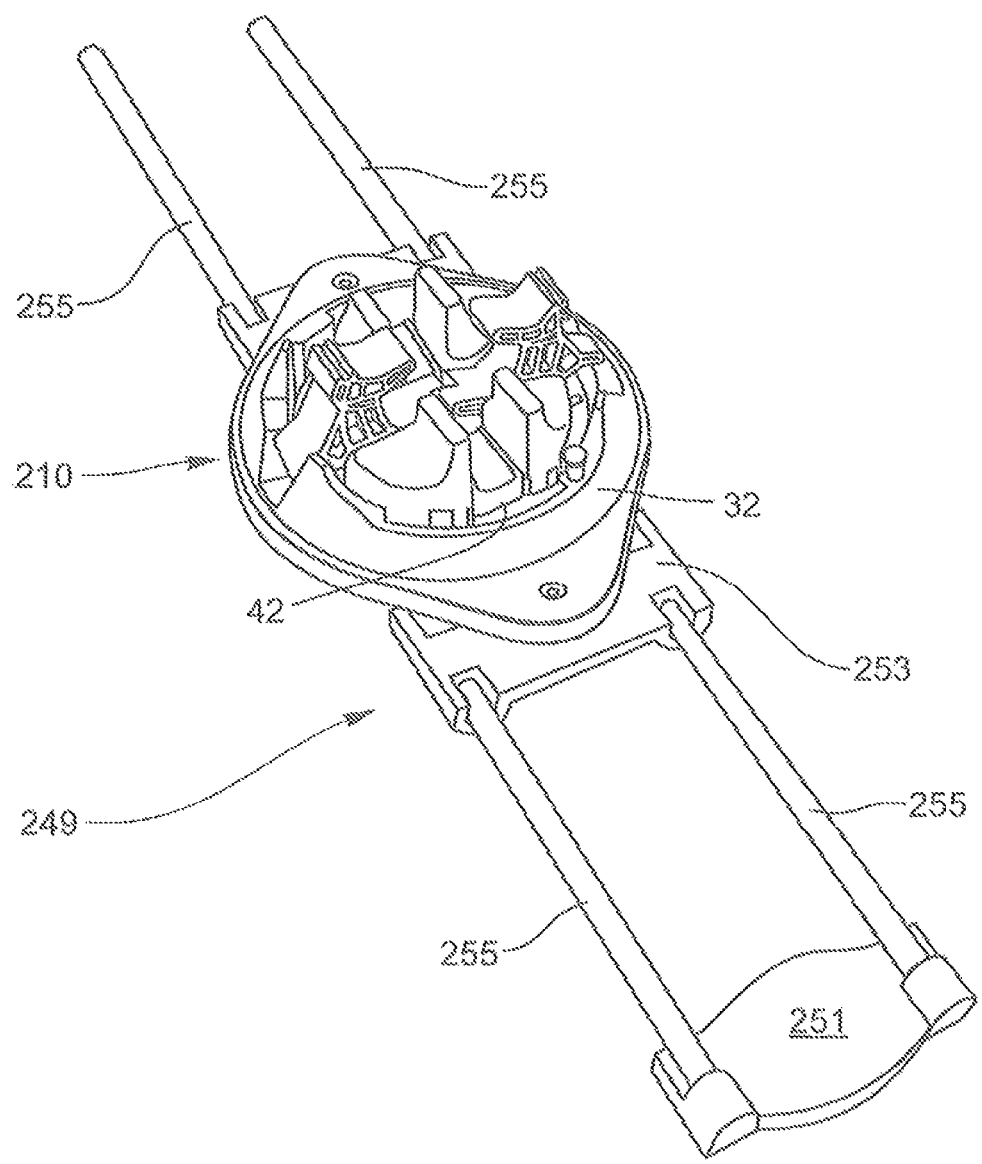
FIG. 24 is a perspective view of the improved apparatus as attached to the height adjustment rail system.

Each of the locking arms 44, 46 has a pair of integrally formed shafts 80 that are rotatably retained by the corresponding pair of anchors 72. Although the improved apparatus 210 does not have the anchors 72 for rotatably retaining the shafts 80 in the same manner as the prior art apparatus 10, the improved apparatus 210 has cradles 225 (shown in FIG. 17) and a plurality of removable side support blocks 227 (shown in FIGS. 9, 10, 14, and 18) that together rotatably retain the shafts 80 of the locking arms 44, 46. The preferred configuration and the various functions of the side support blocks 227 will be described in more detail herein below.

Each of the locking arms 44, 46 of the prior art apparatus 10 also has a gripping end 82 disposed to pivot inward about the shafts 80 in such a manner that, after insertion of the wheel 20, the gripping ends 82 are disposed adjacent to the rim 26 to block longitudinal motion of the wheel 20 away from the prior art apparatus 10. If the locking arms 44, 46 are not locked in place, they can be removed from the closed position in response to outward pressure of the rim 26 against the gripping ends 82 so that the gripping ends 82 no longer block withdrawal of the wheel 20.

Additionally, each of the locking arms 44, 46 has a receiving end 84 positioned generally inward of the corresponding gripping end 82. Upon insertion, the wheel 20 presses against the receiving ends 84 to induce the locking arms 44, 46 to pivot into the closed position. Each of the locking arms 44, 46 also has a locking feature designed to cooperate with one of the arcuate lips 58 to lock the locking arms 44, 46 in the closed position in response to rotation of the core member 42 within the collar 40. As illustrated in FIG. 1, the locking features are locking abutments 86 disposed at the lateral extents of the locking arms 44, 46. The operation of the locking abutments 86 will be described in greater detail subsequently.

Figure 9:
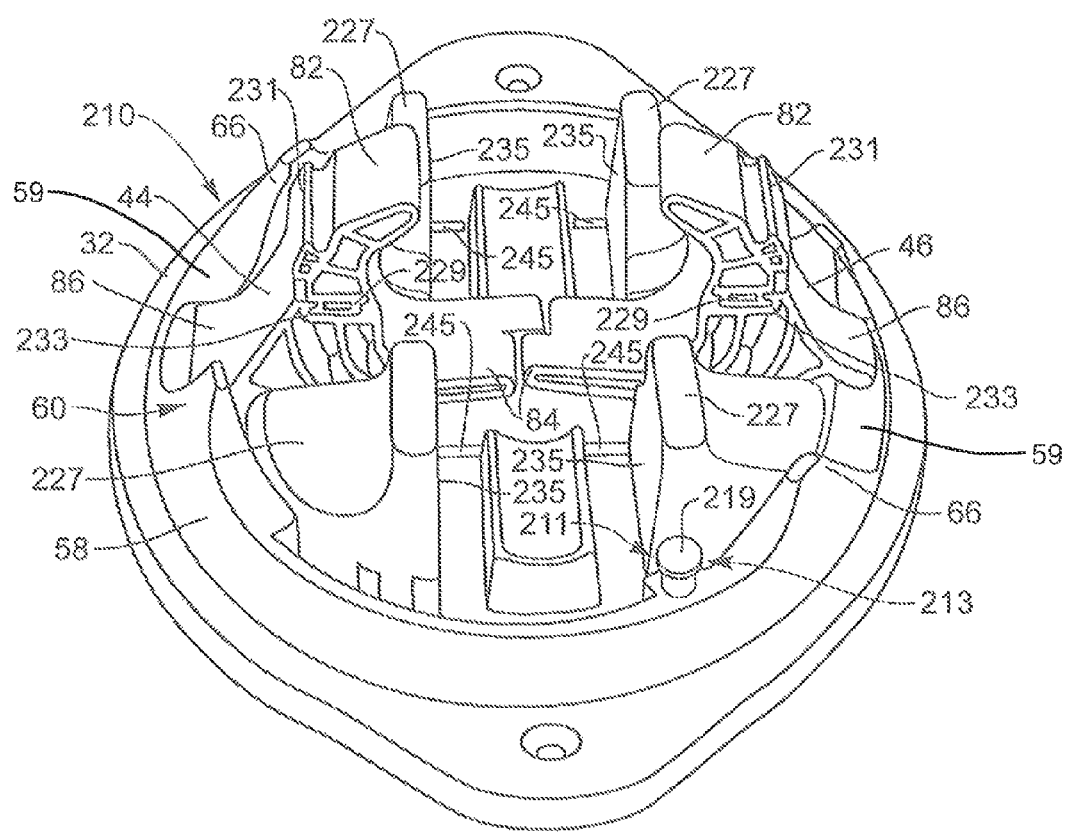
FIG. 9 is a perspective view of an improved apparatus of one embodiment showing the locking arms in the open configuration.
Figure 13:
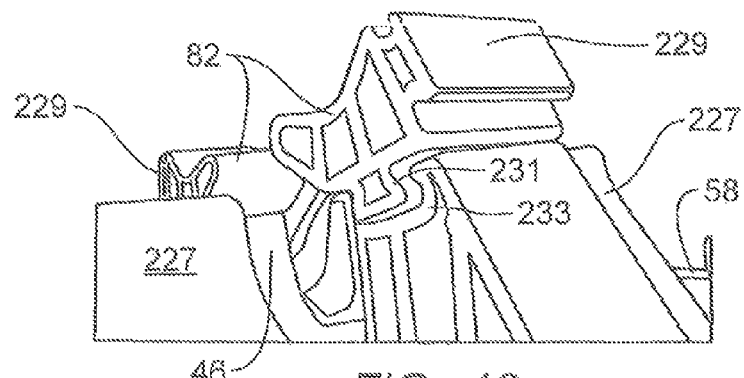
FIG. 13 is an enlarged perspective view of the locking arms showing how the clamp tip can be slid into an alternative configuration for use with skinny bicycle tires (e.g., road racing tires)
Figure 14:
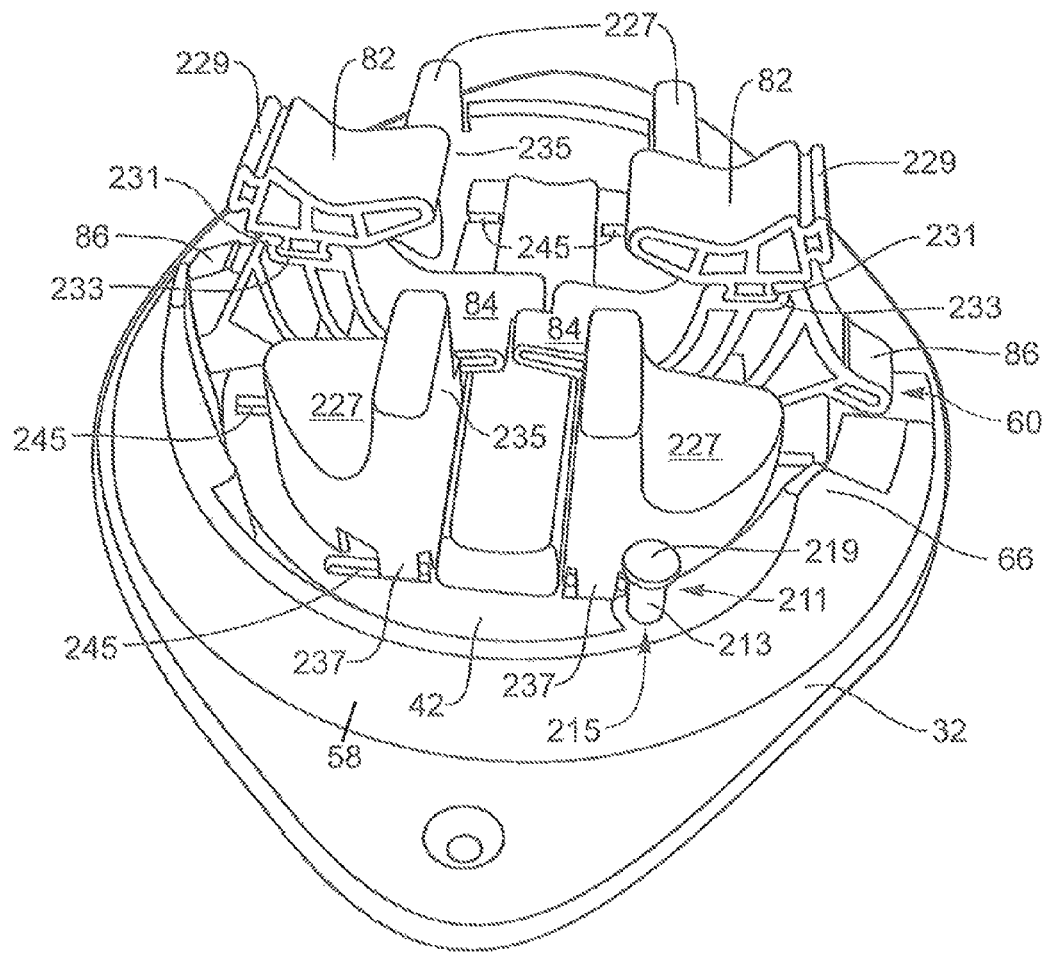
FIG. 14 is a perspective view of the improved apparatus in an open configuration and showing how the locking arms and the adjustable side support blocks can be configured to accommodate a skinny bicycle tire.
Figure 15:
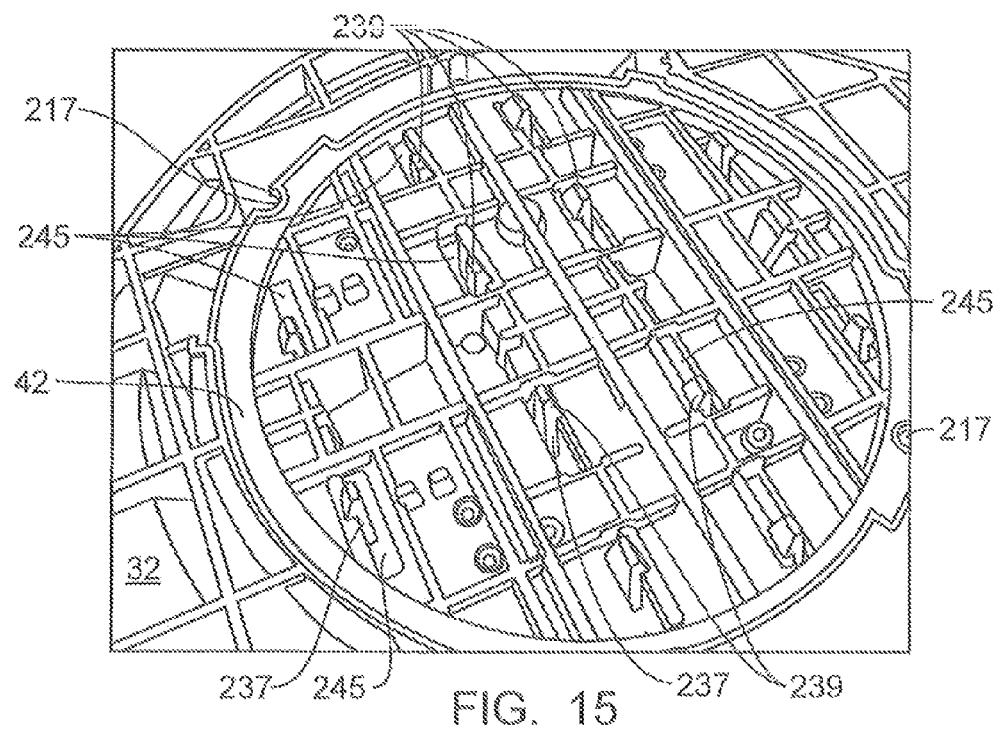
FIG. 15 is a perspective view of the underside of the improved apparatus showing the resilient grasping tabs.
Figure 16:
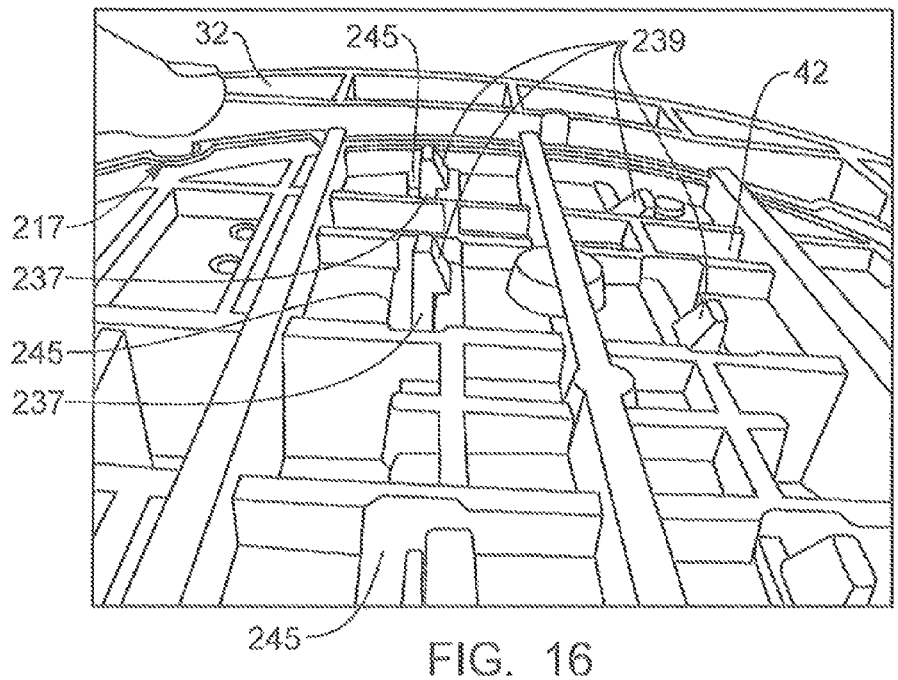
FIG. 16 is an enlarged perspective view of the underside of the improved apparatus showing the ends of several resilient grasping tabs.

The improved apparatus 210 is much more versatile than the prior art apparatus 10. The improved apparatus 210 is adjustable to accommodate and more safety secure different types and sizes of bicycle tires. The gripping ends 82 of each of the locking arms 44, 46 may be removable and can be disposed into first and second configurations. For example, the first configuration may accommodate larger bike tires such as fat mountain bike tires, and the second configuration may accommodate smaller bike tires such as skinny road bike race tires. Each gripping end 82 may have a plurality of dovetail protrusions, including a first dovetail 229 and a second dovetail 231. Each dovetail 229, 231 may mate with a groove 233 on each of the locking arms 44, 46 to form a sliding dovetail joint (the first configuration is shown in FIGS. 9 and 10, the second configuration is shown in FIGS. 13 and 14). When the first dovetail 229 slidably engages the groove 233, the gripping end 82 is in the first configuration. When the second dovetail 231 slidably engages the groove 233, the gripping end 82 is in the second configuration. Of course, it should be understood that using the sliding dovetail joint is an exemplary configuration, but that other types of joints can also be used without departing from the spirit of the invention. For example, the dovetail could be on the locking arms 44, 46 and the grooves on the gripping ends 82, or instead of a dovetail a protruding cylinder could be used and the groove would have a circular shape for receiving the cylinder, or again instead of a dovetail a protruding-T could be used with a T-slot as the groove, or any other suitable joint could be used.

To better secure the front tire of the bicycle to be stored, the side support blocks 227 are provided. The side support blocks 227 also provide torque points to facilitate the rotation of the shuttle 34 without applying undue pressure to the locking arms 44, 46. The side support blocks 227 are preferably removable from the core member 42 and position adjustable to accommodate differing types of tires. In one embodiment of the side support blocks 227, each side support block 227 is shaped the same with right side blocks being mirror images of the left side blocks. The right side blocks are interchangeable with each other right side support block 227, and the left side blocks are interchangeable with each other left side support block 227. Each side support block 227, whether right side or left side, (best shown in FIG. 18) comprises an abutment face 235 for abutting the side of a tire secured within the improved apparatus 210, a plurality of resilient grasping tabs 237 each with an inclined hook 239, receiving wells 241, and shaft-engaging arcs 243. The core member 42 has a plurality of slots 245 (best shown in FIGS. 11 and 15-17) for receiving the resilient grasping tabs 237 and adjustment posts 247 (shown in FIG. 17) to be captured in the receiving wells 241.

To remove a side support block 227 from the core member 42, a user simply grasps the inclined hooks 239 of a single side support block 227 and squeezes until the inclined hooks 239 release and can be withdrawn through the slots 245. The side support block 227 can then be configured into one of two positions, a narrow position and a wide position. FIG. 14 shows positional examples with the two side support blocks 227 nearest the viewer in the narrow position and the two side support blocks 227 farthest from the viewer in the wide position. The illustrated embodiment of the improved apparatus 210 has just two positions, narrow and wide. To provide these narrow and wide adjustments, the core member 42 has two adjustment posts 247 and the side support block 227 has a trio of receiving wells 241. Of course, it should be understood that more adjustments can be provided by having more adjustment posts 247 and more receiving wells 241, or other forms of lateral adjustment could be used.

To position the side support block 227 as desired, the side support block 227 is placed where desired (either for narrow or wide position) with the inclined hooks 239 resting on the edge of the slots 245 and the adjustment posts 247 subtending the receiving wells 241. A downward force applied to the side support block 227 causes the resilient grasping tabs 237 to flex as the incline of each inclined hook 239 moves into the corresponding slot 245 until the inclined hook 239 snaps into place.

When snapped into the desired position, one of the shaft-engaging arcs 243 encloses the cradle 225 about the shaft 80 of the locking arm 44, 46 so that the shaft 80 can rotate freely within the cradle 225.

In FIG. 1, the prior art apparatus 10 is in the open, unlocked configuration to permit insertion of the wheel 20 into engagement with the prior art apparatus 10. Similarly, FIGS. 9 and 14 show the improved apparatus 210 in the open, unlocked configuration to permit insertion of the wheel 20 into engagement with the improved apparatus 210. The locking arms 44, 46 are thus in the open position. The core member 42 cannot be rotated significantly in either direction because the locking abutments 86 are disposed in the breaks 60 of the arcuate lips 58. The locking abutments 86 are disposed proximate the plate 50 within the breaks 60. Hence, the arcuate lips 58 interfere with motion of the locking abutments 86 in the transverse direction 16, thereby preventing significant rotation of the core member 42.

The wheel 20 is disposed within a substantially vertical plane to align the wheel 20 with the open locking arms 44, 46. More precisely, the wheel 20 is disposed within the plane generally defined by the longitudinal and transverse directions 12, 16. In this application, a "substantially vertical plane" does not refer to a plane that is precisely vertical. Rather, the improved apparatus 210 permits the wheel 20 to be inserted along some relatively small angle with respect to a precisely vertical plane.

The wheel 20 may be inserted along an engagement direction, illustrated by an arrow 90 (FIG. 1) generally parallel to the longitudinal direction 12. The tire 24 contacts the receiving ends 84 of the locking arms 44, 46 and presses against them to pivot the locking arms 44, 46 from the open position to the closed position. The receiving ends 84 may be interdigitated or otherwise designed such that the tire 24 contacts both receiving ends 84 substantially simultaneously. The gripping ends 82 extend to a position adjacent to the rim 26 to block removal of the wheel 20 from the locking arms 44, 46. This is the configuration illustrated in FIG. 2.

Figure 2:
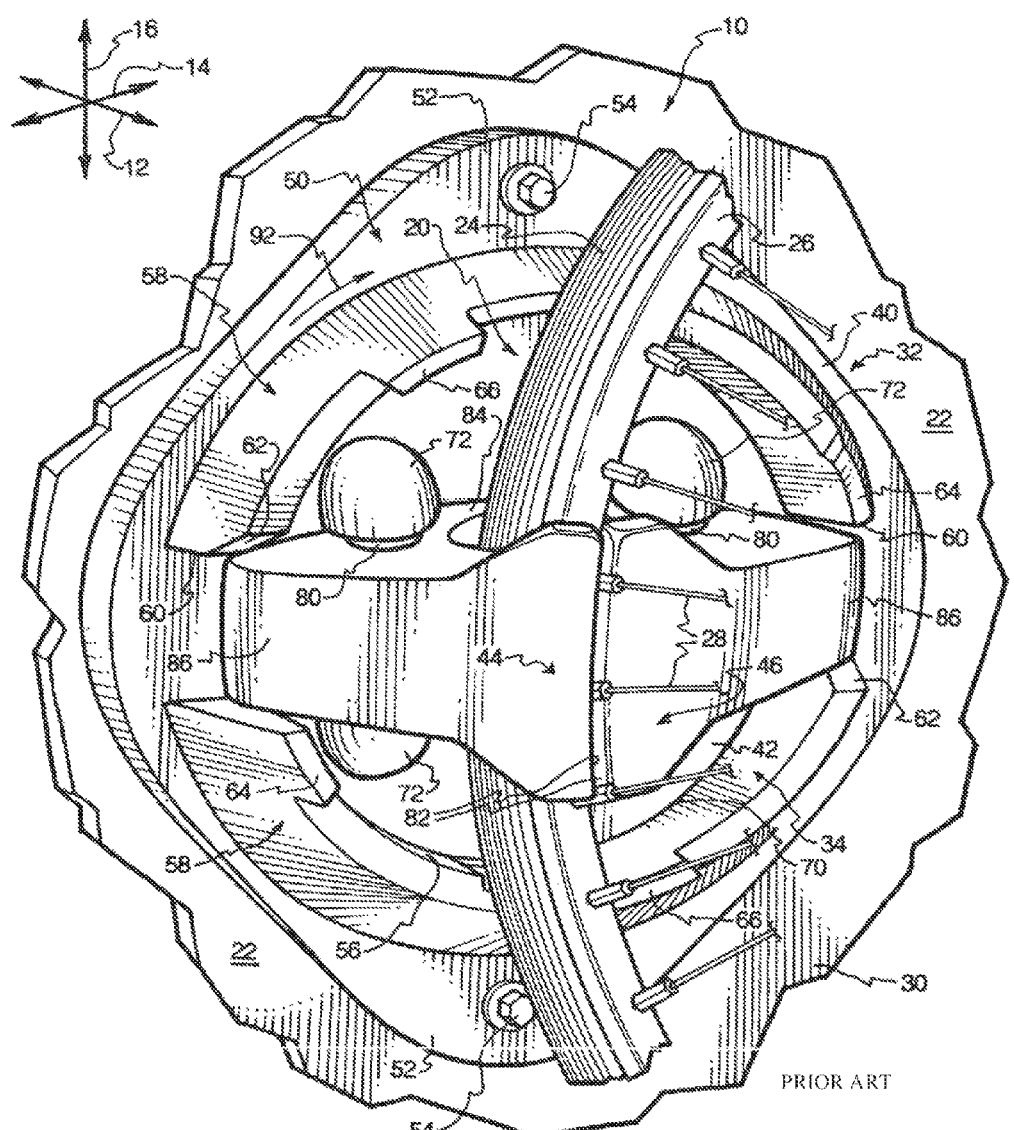

Referring to FIG. 2, a perspective view illustrates the prior art apparatus 10 of FIG. 1, in the closed, unlocked configuration. Similarly, FIGS. 10 and 13 show the improved apparatus 210 in the closed configuration. The wheel 20 has been inserted into engagement with the prior art apparatus 10 as indicated above. Thus, the locking arms 44, 46 have moved to the closed position. The gripping ends 82 are disposed adjacent to the rim 26 to sandwich the spokes 28. The gripping ends 82 are shaped to avoid exerting excessive pressure against the spokes 28 to ensure that the spokes 28 are not damaged by the prior art apparatus 10 or the improved apparatus 210.

In FIG. 2, the locking arms 44, 46 are not locked in the closed position. Thus, if the wheel 20 is drawn away from the prior art apparatus 10 in the longitudinal direction 12, i.e., in a direction generally opposite to the engagement direction, the rim 26 will push against the gripping ends 82 of the locking arms 44, 46 to move the locking arms 44, 46 back to the open position, thereby permitting removal of the wheel 20 from the prior art apparatus 10.

The locking arms 44, 46 may be locked in the closed position by rotating the locking arms 44, 46 and the core member 42 with respect to the collar 40. Motion of the locking arms 44, 46 to the closed position moves the locking abutments 86 away from the plate 50 so that the locking abutments 86 are able to slide over the arcuate lips 58.

However, the tabs 64 of the arcuate lips 58 extend in the longitudinal direction 12 to an extent that they interfere with rotation of the locking abutments 86 in a counterclockwise direction. Hence, the core member 42 and the locking arms 44, 46 are only able to rotate in the clockwise direction, i.e., in a locking direction indicated by an arrow 92 (FIG. 2). The beveled portions 62 facilitate motion of the locking abutments 86 out of the breaks 60 and over a slide portion 59 (FIGS. 7 and 9) of the arcuate lips 58 along the locking direction. Motion of the core member 42 and the locking arms 44, 46 along the locking direction results in the configuration illustrated in FIG. 3.

Figure 3:
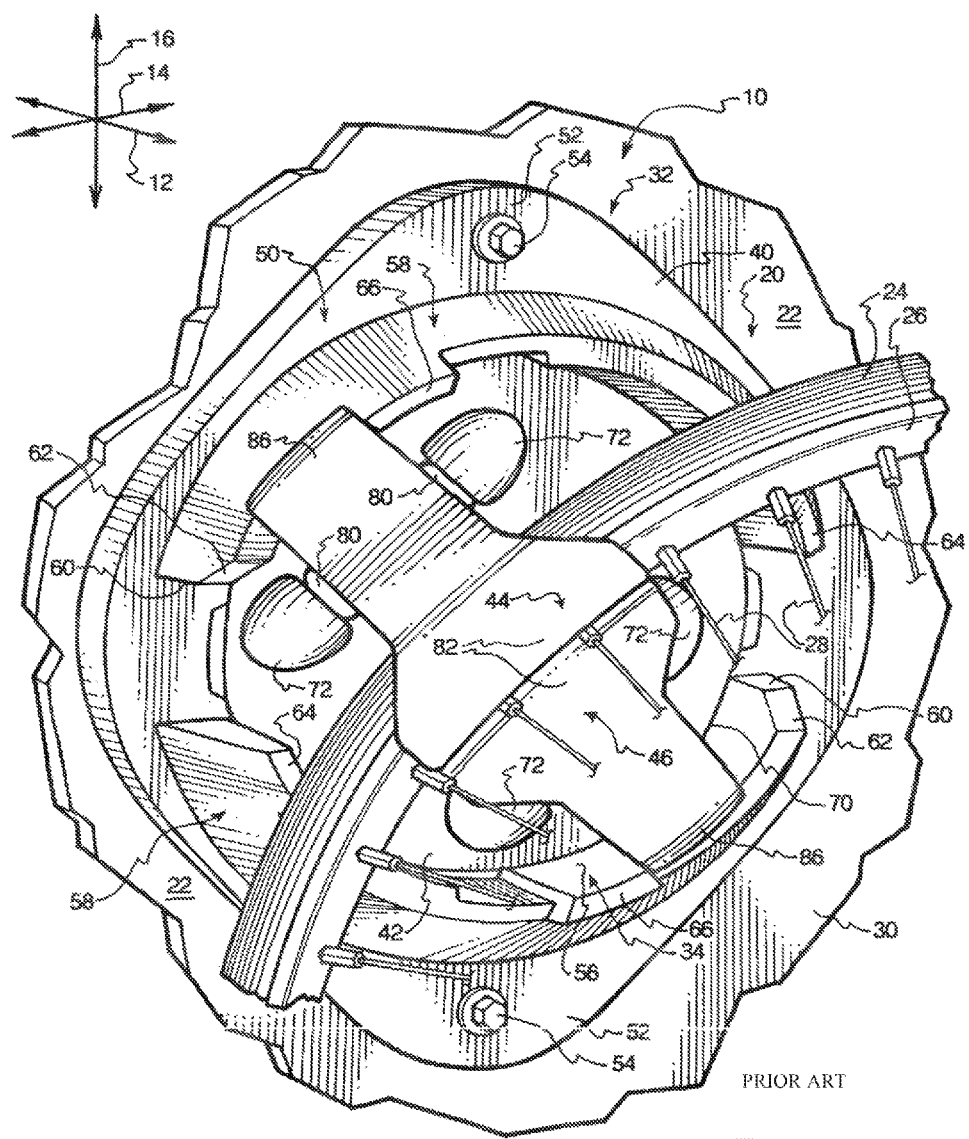

Referring to FIG. 3, a perspective view illustrates the prior art apparatus 10 in the closed, locked configuration to retain the wheel 20. FIG. 10 shows the improved apparatus 210 in the closed, locked configuration, but not yet secured (the push/pull locking pin 213 has not yet been pushed in, although the push/pull locking pin 213 has been aligned with the pin-receiving cavity 217 (FIG. 11)). The core member 42 and the locking arms 44, 46 have been rotated with respect to the collar 40, along the locking direction, as indicated previously. The tabs 66 limit rotation of the core member 42 and the locking arms 44, 46 in the clockwise direction because the locking abutments 86 abut the tabs 66 when the core member 42 and locking arms 44, 46 have rotated along a maximum angle along the locking direction.

The maximum angle may be any angle to which the wheel 20 is able to rotate with respect to the remainder of the bicycle. For example, the maximum angle may range from about fifteen degrees to about forty-five degrees. More specifically, the maximum angle may range from about twenty degrees to about thirty-five degrees. Yet more specifically, the preferred maximum angle may be about twenty-six degrees.

Once the locking abutments 86 are disposed over the arcuate lips 58, the arcuate lips 58 interfere with motion of the locking abutments 86 back toward the plate 50, in the longitudinal direction 12. Hence, the locking arms 44, 46 are unable to rotate back to the open position. The locking arms 44, 46 are effectively locked in the closed position to retain the wheel 20. To secure the core member 42 from rotating within the improved apparatus 210, the push/pull locking pin 213 is pushed in so that it engages the pin-receiving cavity 217 of the core member 42.

The locking arms 44, 46 remain in the closed position until the core member 42 and the locking arms 44, 46 are rotated counterclockwise, i.e., in a direction opposite to the engagement direction, to return the prior art apparatus 10 to the configuration of FIG. 2. The wheel 20 may then be withdrawn from the prior art apparatus 10 in a direction generally opposite to the engagement direction. Pressure of the rim 26 against the gripping ends 82 opens the locking arms 44, 46 to release the wheel 20, thereby returning the prior art apparatus 10 and the wheel 20 to the configuration illustrated in FIG. 1.

Similarly, the locking arms 44, 46 of the improved apparatus 210 remain in the closed position until the push/pull locking pin 213 is disengaged by pulling it from the pin-receiving cavity 217 of the core member 42 and the locking arms 44, 46 are rotated counterclockwise, i.e., in a direction opposite to the engagement direction, to return the improved apparatus 210 to the configuration of FIG. 9 or 14. The wheel 20 may then be withdrawn from the improved apparatus 210 in a direction generally opposite to the engagement direction. Pressure of the rim 26 against the gripping ends 82 opens the locking arms 44, 46 to release the wheel 20.

Referring to FIG. 4, a side elevation view illustrates a bicycle 100 that may be easily stored or removed from storage through the use of the prior art apparatus 10. As illustrated, the bicycle 100 has a rear wheel 102, a frame 104, a seat 106, handlebars 108, and pedals 110, in addition to the front wheel 20. Immediately after a user has ridden the bicycle 100, the bicycle 100 is not disposed vertically as illustrated in FIG. 4, but is generally horizontal with both wheels 20, 102 in contact with the ground 112.

To store the bicycle 100, a user may first grasp the handlebars 108 and pull them upward while pivoting the frame 104 such that the front wheel 20 is disposed generally above the rear wheel 102. The wheel 20 is disposed within the substantially vertical plane. The user may move the bicycle 100, for example, by moving the handlebars 108 while continuing to allow the rear wheel 102 to rest on the ground 112 until the bicycle 100 is aligned with the prior art apparatus 10, as illustrated in FIG. 4. The prior art apparatus 10 is disposed as illustrated in FIG. 1. The user may then move the handlebars to move the wheel 20 in the engagement direction, as illustrated by FIG. 1.

Referring to FIG. 5, a side elevation view illustrates the bicycle 100 when the front wheel 20 and the remainder of the bicycle 100 have been moved in the engagement direction. In response to contact of the front wheel 20 against the receiving ends 84, the locking arms 44, 46 have been moved to the closed configuration as illustrated by FIG. 2. The front wheel 20 is still within the substantially vertical plane so that the bicycle 100 is not locked in place by the prior art apparatus 10. From the configuration of FIG. 5, the user may rotate the handlebars 108 to urge the core member 42 and the locking arms 44, 46 to rotate into the configuration illustrated in FIG. 3.

Referring to FIG. 6, a rear elevation view illustrates the resulting configuration of the bicycle 100 after rotation of the handlebars 108 in the manner indicated previously. The bicycle 100 is stored adjacent to a second bicycle 114 and a third bicycle 116. The locking arms 44, 46 are locked such that the bicycle 100 is retained by the prior art apparatus 10. The rear wheel 102 may continue to rest on the ground 112. The second and third bicycles 114, 116 are retained by second and third bicycle storage apparatuses 118, 120 that are similar in configuration to the prior art apparatus 10 of FIG. 1.

Hence, the user may store the bicycle 100 with the prior art apparatus 10 by simply utilizing the handlebars 108 to move the front wheel 20. The user need not even touch the prior art apparatus 10 to store the bicycle 100. The user also need not lift the entire weight of the bicycle 100 from the ground 112 to store the bicycle 100. The opposite procedure is followed to remove the bicycle 100 from storage. Consequently, the user may also remove the bicycle 100 from the prior art apparatus 10 by moving the handlebars 108, without even touching the prior art apparatus 10 or lifting the entire weight of the bicycle 100.

Bicycle storage using the prior art apparatus 10 is relatively compact because the bicycle 100 is stored in a substantially vertical configuration. The apparatuses 10, 118, 120 may be arrayed in a generally horizontal line along the wall 22 to enable the bicycle 100 to be stored parallel with the second and third bicycles 114, 116, as shown in FIG. 6. As shown, the handlebars 108 have been rotated in such a manner that the front wheels 20 of the bicycles 100, 114, 116 have been rotated by an angle 122 with respect to a substantially vertical plane 124. The handlebars 108 are therefore staggered from the corresponding handlebars of the bicycles 114, 116. As a result, the bicycles 100, 114, 116 may be stored with a spacing 126 that is comparatively small.

According to one example, the angle 122 ranges from about 20° to about 35°. More specifically, the angle 122 may be about 26°. The resulting spacing 126 may be approximately sixteen inches. The tabs 64, 66 ensure that the front wheels 20 of the bicycles 100, 114, 116 must rotate in the same direction (i.e., clockwise), and with approximately the same angle 122 (i.e., the maximum angle or less) to avoid interference of the front wheels 20 and/or handlebars 108 with each other. In alternative embodiments, counterclockwise wheel rotation may be used instead of clockwise rotation.

In other alternative embodiments, the wheel 20 may be inserted into engagement with the bicycle storage apparatus along an angle with respect to the substantially vertical plane 124. The wheel 20 may then be rotated to a different angle with respect to the substantially vertical plane 124, or may be rotated into the substantially vertical plane 124 itself. Thus, the bicycle 10 may be retained in place with the front wheel 20 within the substantially vertical plane 124.

Such operation may be obtained with the prior art apparatus 10 by rotating the prior art apparatus 10 about the longitudinal direction 12 by an angle, for example, 26°, before attaching the prior art apparatus 10 to the wall 22. Such a disposition may, however, require a greater spacing between adjacent bicycles 100, 114, 116 because the handlebars 108 of the bicycles 100, 114, 116 may extend further along the lateral direction 14.

One of the principal drawbacks to the prior art apparatus 10 is that when secured to the wall 22, it accommodates the storage of only bicycles of a certain length that corresponds to the height of the bicycle when raised to vertical for storage. As a result, to accommodate different bicycle sizes, multiple prior art apparatuses 10 must be secured at various heights or a single prior art apparatus 10 must be unsecured and the secured at the desired height. This drawback made the prior art apparatus 10 less desirable for families with growing children that grow into bigger and bigger bicycles over time or to bicycle repair shops that have the need to store bicycles of various lengths. Also, the single prior art apparatus 10 does not allow a bicycle to be elevated for storage to capture unused storage space elevated off from the floor.

In another embodiment of the storage system, the improved apparatus 210 can be used to accommodate the storage of bicycles of various lengths and can store a bicycle above the ground. The storage system comprises an improved apparatus 210 and a height adjustment rail system generally designated 249. As best shown in FIG. 19, the height adjustment rail system 249 has end brackets 251, sliding brackets 253, and rails 255. Optionally, the height adjustment rail system 249 may also have a locking mechanism (not shown) and a pivoting rear tire rest 257 (shown in FIG. 25).

FIG. 19 shows the height adjustable rail system 249 with the sliding brackets 253 spaced to receive the improved apparatus 210. The end brackets 251 are secured to the wall 22 so that the rails 255 are substantially vertically disposed. If it is desired to store a bicycle with the rear wheel resting on the floor, the height adjustable rail system 249 may be secured to the wall 22 with the lowermost end bracket 251 relatively close to the floor. However, if it is desired to store a bicycle with the rear wheel above the floor, the height adjustable rail system 249 may be secured to the wall 22 with the lowermost end bracket 251 at a height elevated from the floor. However, to store the bicycle elevated from the floor, something is needed to support the rear wheel of the bicycle. As a result, if there is open wall space above low-lying shelving, water barrels, or some other form of support for the rear wheel, the height adjustment rail system 249 can be secured to the wall 22 above the low-lying shelving, water barrels, or other form of support. If no such support exists, the height adjustment rails system may be equipped with a rear tire rest 257 (FIG. 25).

Although anything that suitably supports the rear tire when the front tire is locked into the improved apparatus 210 may be used, an exemplary embodiment of a rear tire rest 257 is shown in FIG. 25. The exemplary rear tire rest 257 comprises a rigid loop 259 with an angled end 261 that can be spring loaded into a two-position bracket 263. The two-position bracket 263 may be secured directly to the lowermost end bracket 251 or it can be clamped onto the rails 255 by using a rail bracket 265. When the rigid loop 259 is in the first of two positions, it will be generally vertically disposed with the rigid loop 259 nesting into the first groove 267 of the two-position bracket 263. In this first position, the rigid loop 259 is stored substantially against the wall when no bicycle is being stored. When the rigid loop 259 is in the second of two positions, it will be generally horizontally disposed with the rigid loop 259 nesting into the second groove 269 of the two-position bracket 263. In this second position, the rigid loop 259 is positioned to receive and support the rear wheel of a stored bicycle. FIG. 26 shows a bicycle secured to the adjustable rail system 249 via an improved apparatus 210 and resting on a rear tire rest 257 so that the bicycle is stored elevated above the floor 12. The angled end 261 may be cushioned so that the rear tire may rest against the rigid loop 259 in a manner that will not damage the rear tire of the stored bicycle.

To load a bicycle onto an improved apparatus 210 mounted on a height adjustment rail system 249, the front wheel of the bicycle is disposed to engage the receiving ends 84 which causes the locking arms 44, 46 to dose about the tire and rim of the front tire. The front wheel is then rotated clockwise to lock the locking arms 44, 46 about the front wheel as the locking abutments 86 travel the incline of the arcuate lips 58 until the locking abutments 86 meets the tabs 66. The push/pull locking pin 213 can then be pushed in to engage the receiving cavity 217 and to prevent the core member 42 from rotating counterclockwise until the push/pull locking pin 213 is disengaged. Once the front wheel is secured, the bicycle can be walked towards the wall 22 using very little lifting as the improved apparatus 210 slides (with the front wheel secured thereto) upwardly along the rails 255 until the rear wheel is positioned below the front wheel and resting on the floor or some support elevated from the floor. In this manner, the improved apparatus 210 can accommodate bicycles of differing lengths because the improved apparatus 210 travels along rails 255 until the rear wheel is positioned to support the bicycle for storage. As an added safety precaution a locking mechanism (not shown) can be used to lock the sliding brackets 253 into the height position for the bicycle being stored. Any suitable locking mechanism can be used to prevent the sliding brackets 253 from further sliding along the rails 255, such as a clamp, a pin, a ratchet, and the like.

Like the prior art apparatus 10, the improved apparatus 210 may be relatively easily and inexpensively manufactured. According to one example, the collar 40, the core member 42, the locking arms 44, 46, the push/pull locking pin 213 and the side support blocks 227 are all constructed of plastic. The collar 40, the core member 42, the locking arms 44, 46, and the side support blocks 227 may thus be formed by blow molding or the like. According to one example, the collar 40, the core member 42, and the locking arms 44, 46 are each shaped to be molded though the use of a simple, dual-plate process, in which the mold plates can be withdrawn from each other without interference from the molded part. The manner in which this is accomplished is described in greater detail in connection with FIGS. 7 and 8 of U.S. Pat. No. 6,877,613 and is not repeated herein, but is incorporated by this reference.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A system for securing a bicycle to a wall, the system comprising:
   an apparatus comprising:
      a base member attachable to the wall;

a shuttle movable between an unlocked position and a locked position with respect to the base member;

a first locking arm attachable to the shuttle such that the first locking arm is movable with respect to the shuttle between a closed position that blocks withdrawal of the bicycle from the apparatus and an open position that permits withdrawal of the bicycle;

a push/pull locking pin for engaging the shuttle and for preventing the shuttle from moving from the locked position until the push/pull locking pin is disengaged;

wherein the first locking arm is unable to move to the open position when the shuttle is in the locked position; and wherein the base member comprises a collar and the shuttle comprises a core member rotatably captured by the collar; and a height adjustment rail system comprising
at least one rail disposed generally vertically;
a sliding bracket disposed to slide along the rail and to which the apparatus is attached.

2. The system of claim 1, further comprising a second locking arm disposed to cooperate with the first locking arm, wherein the second locking arm is movable between a closed position that blocks withdrawal of the bicycle from the apparatus and an open position that permits withdrawal of the bicycle, and wherein the second locking arm is unable to move to the open position when the shuttle is in the locked position.

3. The system of claim 1, wherein the first locking arm is shaped to retain a front wheel of the bicycle in the closed position, wherein the first locking arm is oriented such that the front wheel of the bicycle is disposed within a substantially vertical plane when the core member is in the unlocked position, and wherein the front wheel is angled from the substantially vertical plane when the core member is in the locked position.

4. The system of claim 3, wherein the base member comprises at least one limiting feature that limits rotation of the core member relative to the collar such that the wheel can only be angled up to about 45 degrees from the substantially vertical plane along a single rotational direction.

5. The system of claim 1, wherein the first locking arm has a gripping end disposed inward of a rim of a wheel of the bicycle in the closed position to interfere with withdrawal of the wheel from the apparatus.

6. The system of claim 5, wherein the first locking arm has a receiving end disposed to receive contact from the wheel to induce the first locking arm to pivot from the open position into the closed position.

7. The system of claim 1, wherein the base member comprises a retention feature disposed to prevent motion of the first locking arm to the open position when the shuttle is in the locked position.

8. The system of claim 7, wherein the first locking arm is pivotally attached to the shuttle, wherein the retention feature comprises an arcuate lip and the first locking arm comprises a locking abutment that abuts the arcuate lip when the shuttle is in the locked position to prevent the first locking arm from pivoting to the open position.

9. The system of claim 1, wherein the height adjustment rail system further comprises a rear tire rest for supporting the rear wheel of the bicycle.

10. The system of claim 5, wherein the gripping end is removable from the first locking arm and can be slidably engaged with the first locking arm in at least two differing configurations.

11. The system of claim 10, wherein the gripping end has at least one dovetail and the first locking arm has at least one groove and the dovetail can engage the groove to create a slidable dovetail joint.

12. The system of claim 1, wherein the apparatus further comprises a plurality of side support blocks, each side support block being removable and can be positioned to accommodate and provide support to the side of differing sized bicycle tires.

13. A system for securing a bicycle to a wall, the system comprising:

an apparatus comprising:
a base member attachable to the wall;
a shuttle movable between an unlocked position and a locked position with respect to the base member;
a first locking arm attachable to the shuttle such that the first locking arm is movable with respect to the shuttle between a closed position that blocks withdrawal of the bicycle from the apparatus and an open position that permits withdrawal of the bicycle; the first locking arm comprising:
a gripping end disposed inward of a rim of a wheel of the bicycle in the closed position to interfere with withdrawal of the wheel from the apparatus; and
the gripping end is removable from the first locking arm and can be slidably engaged with the first locking arm in at least two differing configurations;
wherein the first locking arm is unable to move to the open position when the shuttle is in the locked position; and
wherein the base member comprises a collar and the shuttle comprises a core member rotatably captured by the collar; and
a height adjustment rail system comprising
at least one rail disposed generally vertically;
a sliding bracket disposed to slide along the rail and to which the apparatus is attached.

14. The system of claim 13, wherein the gripping end has at least one dovetail and the first locking arm has at least one groove and the dovetail can engage the groove to create a slidable dovetail joint.

* * * * *